US012725393B2

(12) United States Patent
Prabhaker et al.

(10) Patent No.: US 12,725,393 B2
(45) Date of Patent: Sep. 1, 2026

(54) METHOD AND SYSTEM FOR EXTRACTING SENTIMENTS OR MOOD FROM ART IMAGES

(71) Applicant: SAMSUNG ELECTRONICS CO., LTD., Suwon-si (KR)

(72) Inventors: Chandra Prabhaker, Noida (IN); Mayank Haarit, Noida (IN); Neeraj Kumar, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 786 days.

(21) Appl. No.: 17/873,994

(22) Filed: Jul. 26, 2022

(65) Prior Publication Data

US 2023/0022364 A1 Jan. 26, 2023

Related U.S. Application Data

(63) Continuation of application No. PCT/KR2022/009353, filed on Jun. 29, 2022.

(30) Foreign Application Priority Data

Jul. 14, 2021 (IN) ............................ 202111031722

(51) Int. Cl.
*G06V 10/56* (2022.01)
*G06V 10/20* (2022.01)
(Continued)

(52) U.S. Cl.
CPC ............ *G06V 10/56* (2022.01); *G06V 10/242* (2022.01); *G06V 10/25* (2022.01); *G06V 10/255* (2022.01);
(Continued)

(58) Field of Classification Search
CPC ...... G06V 10/56; G06V 10/242; G06V 10/25; G06V 10/255; G06V 10/764; G06V 10/7747; G06V 10/82
See application file for complete search history.

(56) References Cited

U.S. PATENT DOCUMENTS 6,964,023 B2 11/2005 Maes et al.
8,805,018 B2 8/2014 Li et al.
(Continued)

FOREIGN PATENT DOCUMENTS

CN 108985377 B 6/2019
CN 110956184 A * 4/2020 ........... G06K 9/3208
(Continued)

OTHER PUBLICATIONS

International Search Report and Written Opinion dated Oct. 6, 2022, issued by the International Searching Authority in counterpart International Application No. PCT/KR2022/009353 (PCT/ISA/220, 210, 237).

(Continued)

*Primary Examiner* — Samir A Ahmed
(74) *Attorney, Agent, or Firm* — Sughrue Mion, PLLC

(57) ABSTRACT

A method for extracting sentiments or mood from art images includes: receiving at least one of the art images as an input image; preprocessing the input image; extracting features from the preprocessed input image, the extracting including predicting a color label corresponding to a dominant perceptual color detected from the preprocessed input image a dominant subject from the preprocessed input image, detecting low-level image features from the preprocessed input image, and extracting mood feature information based on a description information included in the input image; classifying the extracted features into a plurality of mood/sentiments classes, using an artificial neural network; and predicting at least one of a mood or a sentiment that is present (Continued)

in the input image based on the dominant perceptual color and the plurality of mood/sentiments classes.

14 Claims, 28 Drawing Sheets

(51) Int. Cl.
*G06V 10/24* (2022.01)
*G06V 10/25* (2022.01)
*G06V 10/764* (2022.01)
*G06V 10/774* (2022.01)
*G06V 10/82* (2022.01)

(52) U.S. Cl.
CPC ........ *G06V 10/764* (2022.01); *G06V 10/7747* (2022.01); *G06V 10/82* (2022.01)

(56) References Cited

U.S. PATENT DOCUMENTS 9,934,363 B1 4/2018 Hwang et al.
2009/0141983 A1* 6/2009 Bing ...................... G06V 10/40 382/254
2014/0072234 A1* 3/2014 Puri ...................... G06V 40/20 382/201
2017/0098122 A1 4/2017 el Kaliouby et al.
2020/0019774 A1 1/2020 Li

FOREIGN PATENT DOCUMENTS

| | | | |
|---|---|---|---|
| CN | 112307982 | A | 2/2021 |
| CN | 111612090 | B | 9/2022 |
| KR | 10-1767651 | B1 | 8/2017 |
| KR | 10-2020-0030252 | A | 3/2020 |
| TW | I470563 | B | 1/2015 |

OTHER PUBLICATIONS

Communication dated Mar. 23, 2023 issued by the Intellectual Property India in Indian Application No. 202111031722.

* cited by examiner

Hue
Saturation
0
1
Value
0

HUE
SATURATION
Cone_Angle
Value $$Cone\_Angle = \frac{Saturation}{256 - Value}$$

The Visible Spectrum 1.0 0.8 0.6 0.4 0.2 0.0

Figure 12:
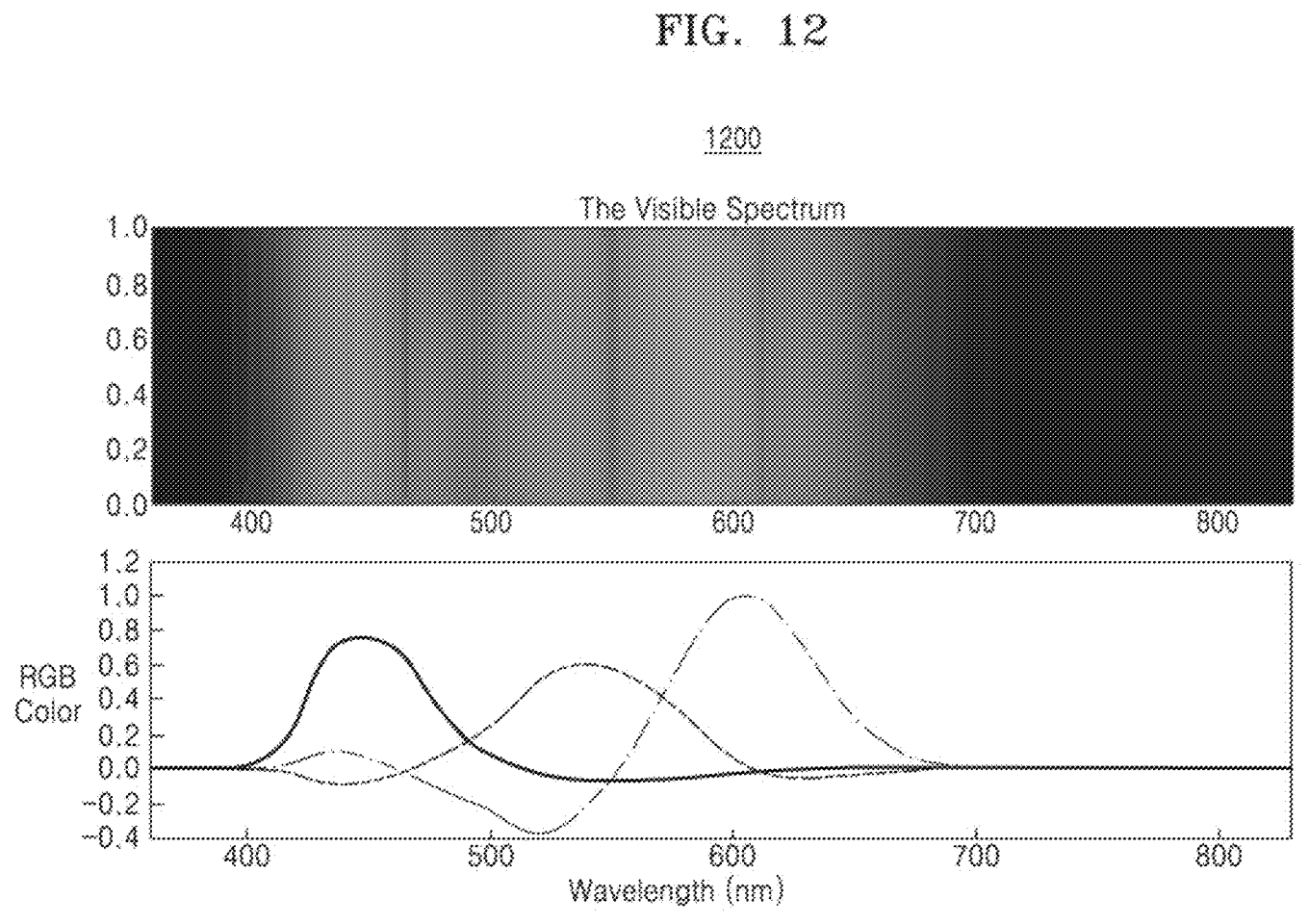

400 500 600 700 800

RGB Color 1.2 1.0 0.8 0.6 0.4 0.2 0.0 −0.2 −0.4

400 500 600 700 800

Wavelength (nm)

FIG. 14B

Model: "Original VGG16"

| Layer (type) | Output Shape | Param # |
|---|---|---|
| input_2 (InputLayer) | (None, 224, 224, 3) | 0 |
| block1_conv1 (Conv2D) | (None, 224, 224, 64) | 1792 |
| block1_conv2 (Conv2D) | (None, 224, 224, 64) | 36928 |
| block1_pool (MaxPooling2D) | (None, 112, 112, 64) | 0 |
| block2conv1 (Conv2D) | (None, 112, 112, 128) | 73856 |
| block2conv2 (Conv2D) | (None, 112, 112, 128) | 147584 |
| block2pool (MaxPooling2D) | (None, 56, 56, 128) | 0 |
| block3conv1 (Conv2D) | (None, 56, 56, 256) | 295168 |
| block3conv2 (Conv2D) | (None, 56, 56, 256) | 590080 |
| block3conv3 (Conv2D) | (None, 56, 56, 256) | 590080 |
| block3pool (MaxPooling2D) | (None, 28, 28, 256) | 0 |
| block4conv1 (Conv2D) | (None, 28, 28, 512) | 1180160 |
| block4conv2 (Conv2D) | (None, 28, 28, 512) | 2359808 |
| block4conv3 (Conv2D) | (None, 28, 28, 512) | 2359808 |
| block4pool (MaxPooling2D) | (None, 14, 14, 512) | 0 |
| block5conv1 (Conv2D) | (None, 14, 14, 512) | 2359808 |
| block5conv2 (Conv2D) | (None, 14, 14, 512) | 2359808 |
| block5conv3 (Conv2D) | (None, 14, 14, 512) | 2359808 |
| block5pool (MaxPooling2D) | (None, 7, 7, 512) | 0 |
| flatten (Flatten) | (None, 25088) | 0 |
| fc1 (Dense) | (None, 4096) | 102764544 |
| fc2 (Dense) | (None, 4096) | 16781312 |
| predictions (Dense) | (None, 1000) | 4097000 |

*Original*

Blue color layers are modified or changed in our approach

FIG. 14C

Last Few modified/changed layers for Model:

| | | |
|---|---|---|
| block5conv1 (Conv2D) | (None, None, None, 512) | 2359808 |
| block5conv2 (Conv2D) | (None, None, None, 512) | 2359808 |
| block5conv3 (Conv2D) | (None, None, None, 512) | 2359808 |
| globalaveragepooling2d1 ( | (None, 512) | 0 |
| dense1 (Dense) | (None, 256) | 131328 |
| dropout1 (Dropout) | (None, 256) | 0 |
| dense2 (Dense) | (None, 8) | 2056 |

==============================================

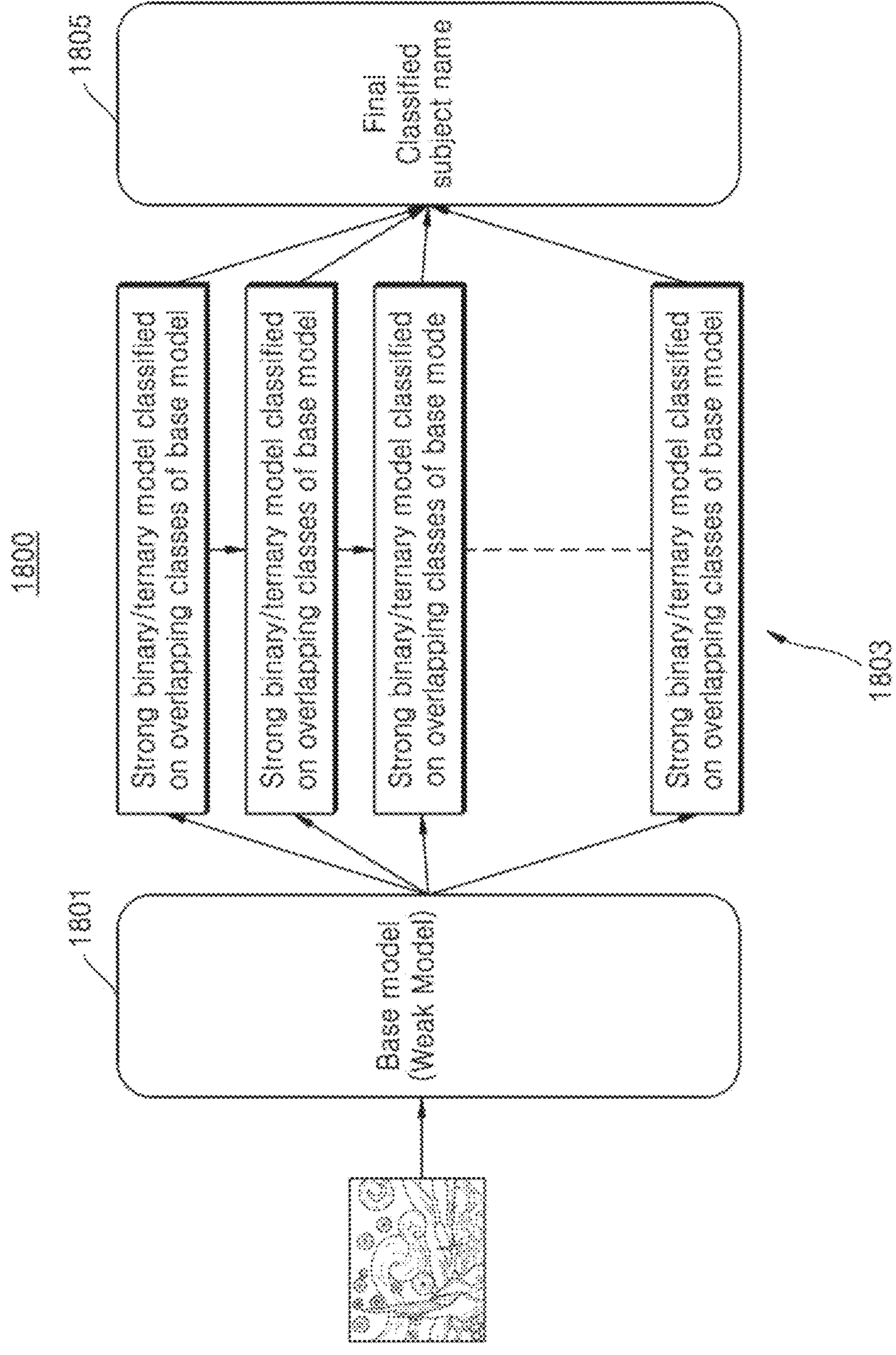
FIG. 18
1800
1801
Base model
(Weak Model)
Strong binary/ternary model classified on overlapping classes of base model
Strong binary/ternary model classified on overlapping classes of base model
Strong binary/ternary model classified on overlapping classes of base mode
Strong binary/ternary model classified on overlapping classes of base model
1803
1805
Final
Classified
subject name

FIG. 19B

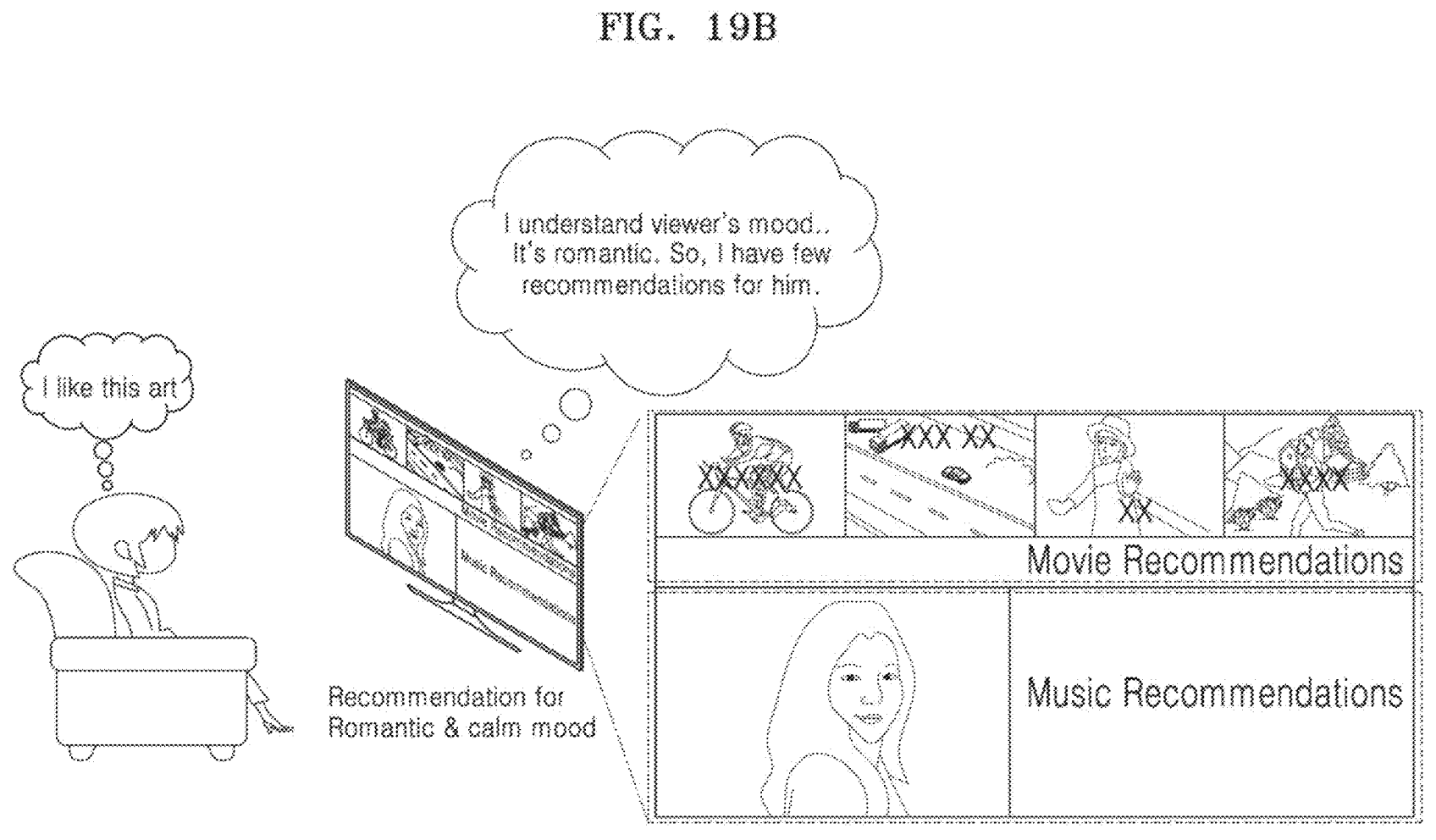

I like this art

Recommendation for Romantic & calm mood

I understand viewer's mood.. It's romantic. So, I have few recommendaions for him.

Movie Recommendations

Music Recommendations

[Emotion & Mood] Night, Scary ?

[Emotion & Mood]
- Romantic (60%), Lonely (24%), Calm (13%)

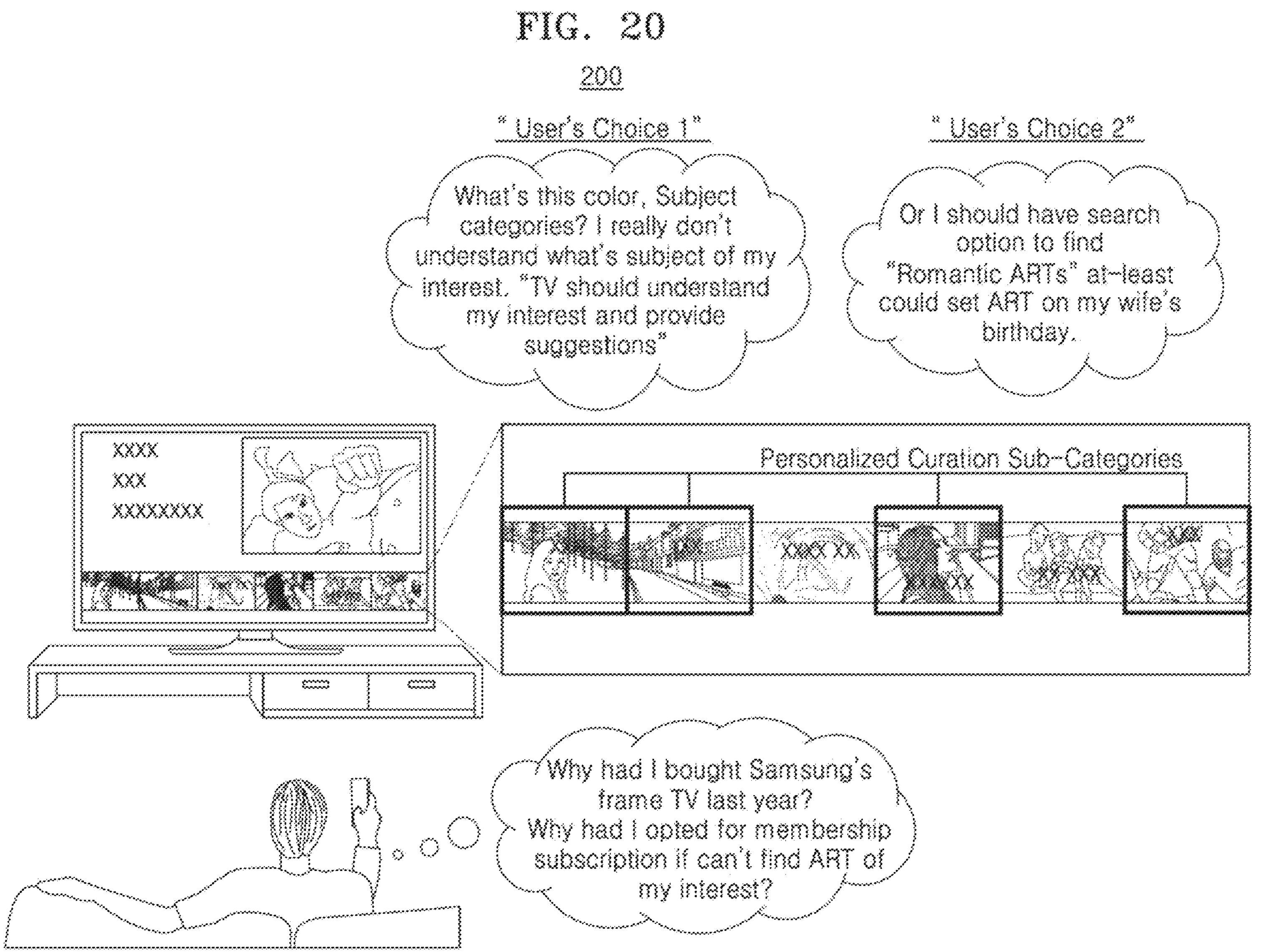
FIG. 20
200
" User's Choice 1"
What's this color, Subject categories? I really don't understand what's subject of my interest. "TV should understand my interest and provide suggestions"
" User's Choice 2"
Or I should have search option to find "Romantic ARTs" at-least could set ART on my wife's birthday.
XXXX
XXX
XXXXXXXX
Personalized Curation Sub-Categories
XXXX XX
XX XXX
Why had I bought Samsung's frame TV last year?
Why had I opted for membership subscription if can't find ART of my interest?

Figure 21:
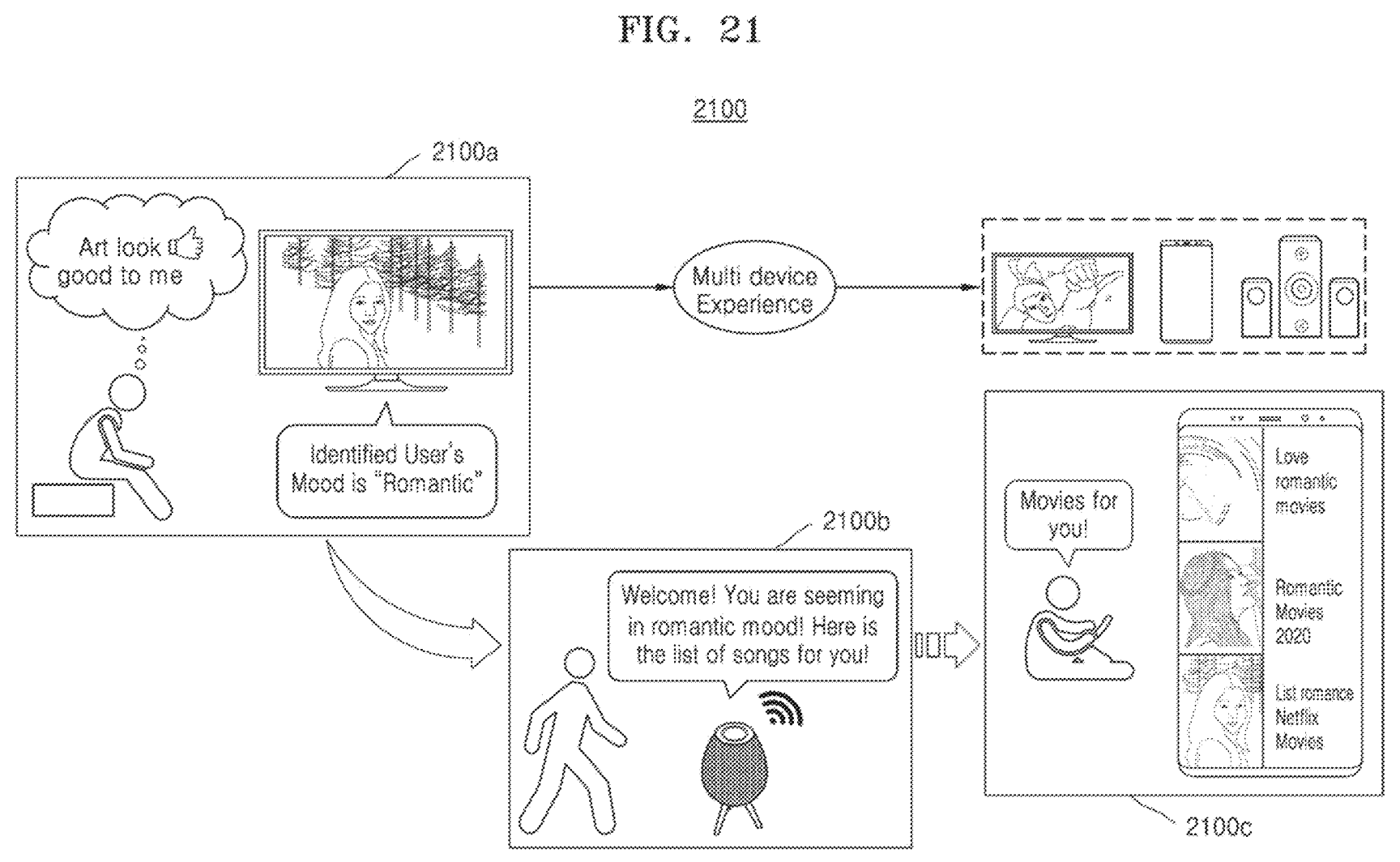

Art look good to me

Identified User's Mood is "Romantic"

Multi device Experience

2100b

Welcome! You are seeming in romantic mood! Here is the list of songs for you!

2100c

Movies for you!

Love romantic movies

Romantic Movies 2020

List romance Netflix Movies

METHOD AND SYSTEM FOR EXTRACTING SENTIMENTS OR MOOD FROM ART IMAGES

CROSS-REFERENCE TO RELATED APPLICATIONS

This application is continuation application International Application No. PCT/KR2022/009353, filed on Jun. 29, 2022, which based on and claims priority to Indian Patent Application No. 202111031722, filed on Jul. 14, 2021, in the Korean Intellectual Property Office, the disclosure of which is incorporated by reference herein in its entirety.

BACKGROUND

1. Field

The disclosure relates to an image processing and, more particularly, to a method for extracting sentiments or mood from art images.

2. Description of Related Art

A mood or sentiments extraction from a typical image can be an easy task. However, extracting mood or sentiments from an artwork images involves a technical challenge. In a recent trend, because the user is attracted towards personalized services, electronic devices offer lots of personalized artwork. Mood is an important parameter that may help personalize the artwork services for users.

The related art methods to extract the color of artwork use, e.g., MPEG-7 color descriptors using Euclidean distance in CIELUV color space and CIELUV is not defined in Cartesian coordinate system. The related art solution generally dealt with mood identification of images instead of artworks. FIG. 1 illustrates a diagram 100 depicting related art technique for mood extraction using facial feature. The related art solution does not take care human subjective perception into account for color classification. The human-readable color name has a fixed value instead of range. For example, red and its shades should be termed as red. Further, there is no method available to determine to extract sentiments from the artworks.

Art images are not like typical images where any image processing technique can work as it has implicit mood behind like dominating color of an image may be one has the highest number of pixels, but art has human perception also. There is an absence of extraction of sentiments from an artwork. In typical images, there are many attributes or objects by which the sentiment may be detected but in the case of artwork it is not straightforward to extract the sentiments. Further, the color of an art image is mapped with mood, but there is no method to extract color correctly by taking care of human subjective perception into account. There is no method to find dominant color based on pixel count.

FIGS. 2 and 3 illustrate diagrams 200 and 300 depicting a related art technique of image tagging set by the manual curator. The FIG. 200 depicts an example of image tagging by the curator. The human may perceive tree leaves in the image as grey, black, or brown, while a curator may tag them to be green. Thus, there is no unified model available for image tagging by the curator. The reference numeral 300*a* depicts that the arts provided by artists as per the related art technique. The reference numeral 300*b* depicts a curator receiving the artwork, and understanding the artwork. The metadata information related to artwork is generated. The reference numeral 300*c* depicts that the manually generated metadata information may be used to identify user's interest and provide recommendations. However, the manual curation method lacks uniformity and accuracy. It also involves additional costs. Further, the related art method of mood extraction has following limitations:

It does not take human subjective perception into account;

Artwork colors have relationship with mood, e.g., blue can bring about depressing feelings while yellow might bring out happiness;

Artwork subjects, e.g., like landscape, cityscape, historical, religious etc., are also linked with sentiment;

There is limited work done on estimation of subject of art image;

There is no direct method to estimate mood of art image due to lack of labeled data, but sub-features, e.g., color and subject, can be directly mapped to mood; and Manual curator is required to define the sentiments of an artwork.

Therefore, there is a need for a mechanism for extracting sentiments or mood from an art image.

SUMMARY

Provided are a method for extracting sentiments or mood from art images.

Additional aspects will be set forth in part in the description which follows and, in part, will be apparent from the description, or may be learned by practice of the presented embodiments.

According to an aspect of the disclosure, there is provided a method for extracting sentiments or mood from art images, the method may include receiving, at least one of the art images as an input image. The method may include preprocessing the input image. The method may include extracting features from the preprocessed input image. The extracting may include predicting a color label corresponding to a dominant perceptual color detected from the preprocessed input image. The extracting may include detecting a dominant subject from the preprocessed input image. The extracting may include detecting, low-level image features from the preprocessed input image. The extracting may include extracting mood feature information based on a description information included in the input image. The method may include classifying the extracted features into a plurality of mood/sentiments classes, using an artificial neural network. The method may include predicting, at least one of a mood or a sentiment that is present in the input image based on the dominant perceptual color and the plurality of mood/sentiments classes.

According to an aspect of the disclosure, there is provided a system for extracting sentiments or mood from art images. The system may include at least one processor. The at least one processor may be configured to receive at least one of the art images as an input image. The at least one processor may be configured to preprocess the input image. The at least one processor may be configured to extract features from the preprocessed input image. The at least one processor may be configured to predict a color label corresponding to a dominant perceptual color detected from the preprocessed input image. The at least one processor may be configured to detect a dominant subject from the preprocessed input image. The at least one processor may be configured to detect low-level image features from the preprocessed input image. The at least one processor may be configured to extract mood feature information based on a description information included in the input image. The at least one processor may be configured to classify the extracted features into a plurality of mood/sentiments classes, using an artificial neural network, to predict at least one of a mood or a sentiment that is present in the input image based on the dominant perceptual color and the plurality of mood/sentiments classes.

According to an aspect of the disclosure, there is provided a non-transitory computer-readable storage medium storing at least one instruction which, when executed by at least one processor, causes the at least one processor to execute a method including: receiving at least one of art images as an input image; preprocessing the input image; extracting features from the preprocessed input image, wherein the extracting includes: predicting a color label corresponding to a dominant perceptual color detected from the preprocessed input image, detecting a dominant subject from the preprocessed input image, detecting, from the preprocessed input image, low-level image features including spatial information about edges and shapes of the input image, and extracting mood feature information based on a keyword present in a description information included in the input image; classifying the extracted features into a plurality of mood/sentiments classes, using an artificial neural network; and predicting at least one of a mood or a sentiment that is present in the input image based on the dominant perceptual color and the plurality of mood/sentiments classes.

BRIEF DESCRIPTION OF THE DRAWINGS

The above and/or other aspects will become apparent and more readily appreciated from the following description of the embodiments, taken in conjunction with the accompanying drawings in which:

FIG. 11 illustrates a flow diagram depicting an embodiment of method for determining the hue value and the cone angle, according to an embodiment;

FIG. 12 illustrates a flow diagram depicting an embodiment of the visible spectrum, according to an embodiment;

FIG. 14B illustrates a table depicting an embodiment of modification convolutional neural network model for subject classification, according to an embodiment;

FIG. 14C illustrates a table depicting an embodiment of last few modified/changed layers of convolutional neural network model, according to an embodiment;

FIG. 18 illustrates an operational flow diagram depicting an embodiment of method of subject classification using model ensemble approach, according to an embodiment;

FIGS. 19A, 19B, 19C, and 19D illustrate the comparison between related art way of recommendation service and manual tagging of mood metadata, and the recommendation service based on extracted mood, and auto tagging of mood metadata, according to an embodiment;

FIG. 20 illustrates an operational flow diagram depicting method for providing user choice and enhancing user experience, according to an embodiment;

FIG. 21 illustrates an operational flow diagram depicting method for mood transfer over multi device, according to an embodiment.

Figure 1:
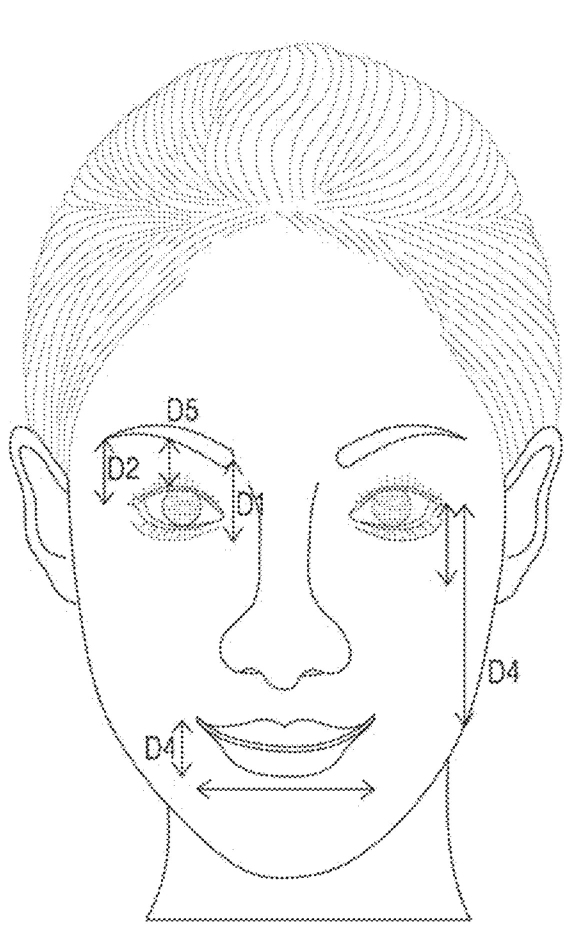
FIG. 1 illustrates a diagram depicting related art technique of mood extraction using facial feature.
Figure 2:
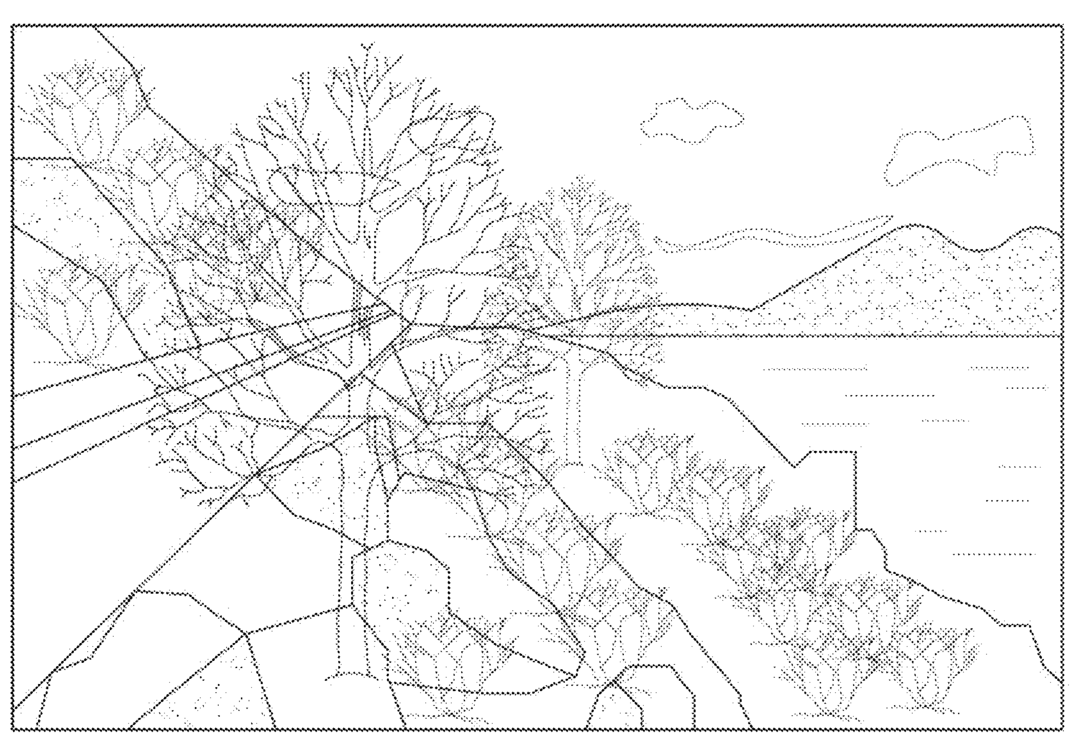
FIG. 2 illustrates a diagram depicting related art technique of image tagging set by manual curator.
Figure 3:
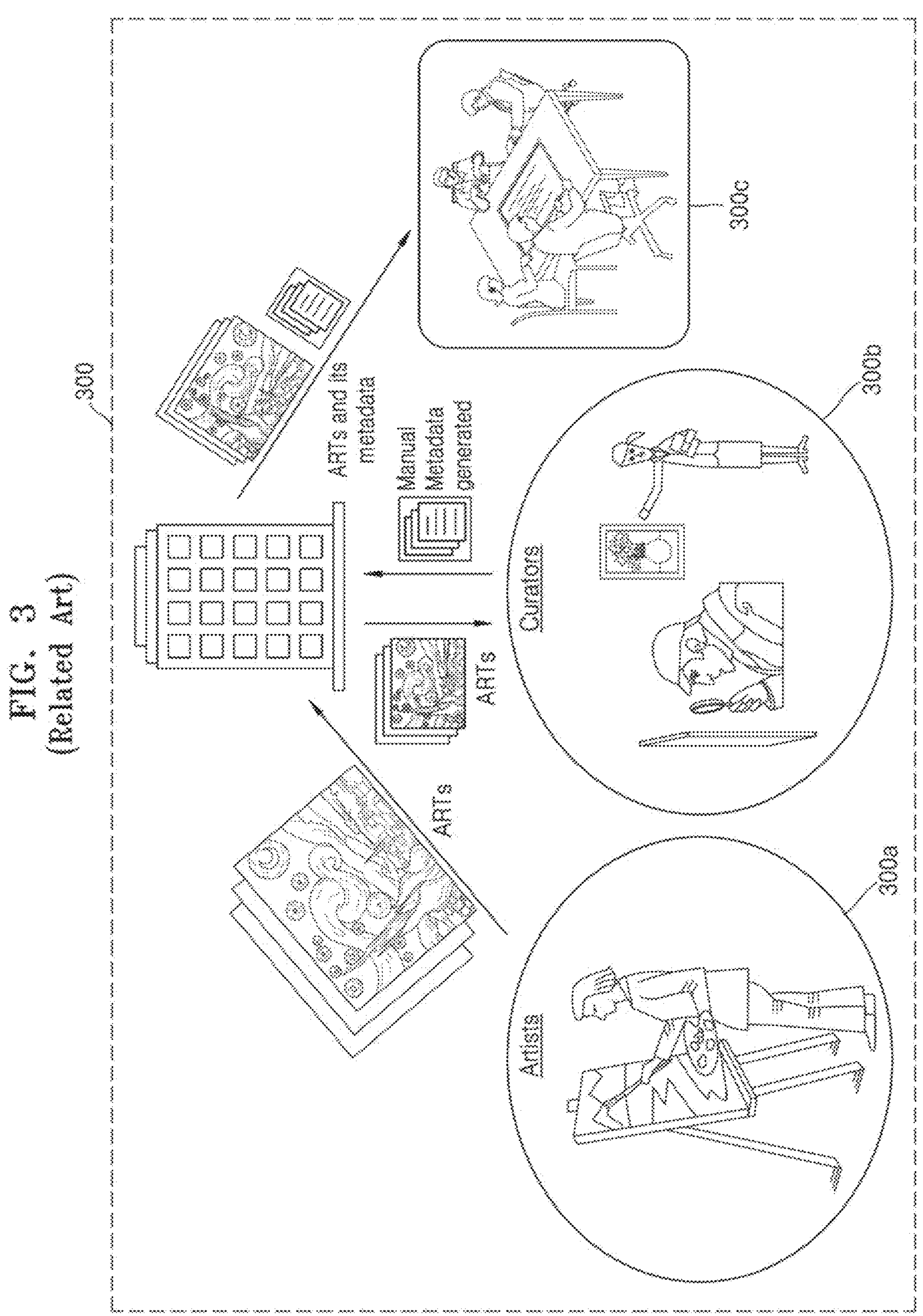
FIG. 3 illustrates a problem in a related art technique of image tagging by the manual curator.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of embodiments. Furthermore, in terms of the construction of the device, one or more components of the device may have been represented in the drawings by related art symbols, and the drawings may show only those specific details that are pertinent to understanding embodiments so as not to obscure the drawings with details that will be readily apparent to those of ordinary skill in the art having benefit of the description herein.

DETAILED DESCRIPTION

It should be understood at the outset that although illustrative implementations of embodiments are described below, embodiments may be implemented using any number of techniques. The described herein should in no way be limited to the illustrative implementations, drawings, and techniques illustrated below, including the exemplary design and implementation illustrated and described herein, but may be modified within the scope of the appended claims along with their full scope of equivalents.

The term “some” as used herein is defined as “none, or one, or more than one, or all.” Accordingly, the terms “none,” “one,” “more than one,” “more than one, but not all”

or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "need to include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element does not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having an ordinary skill in the art.

Certain embodiments will be described below in detail with reference to the accompanying drawings.

Figure 4:
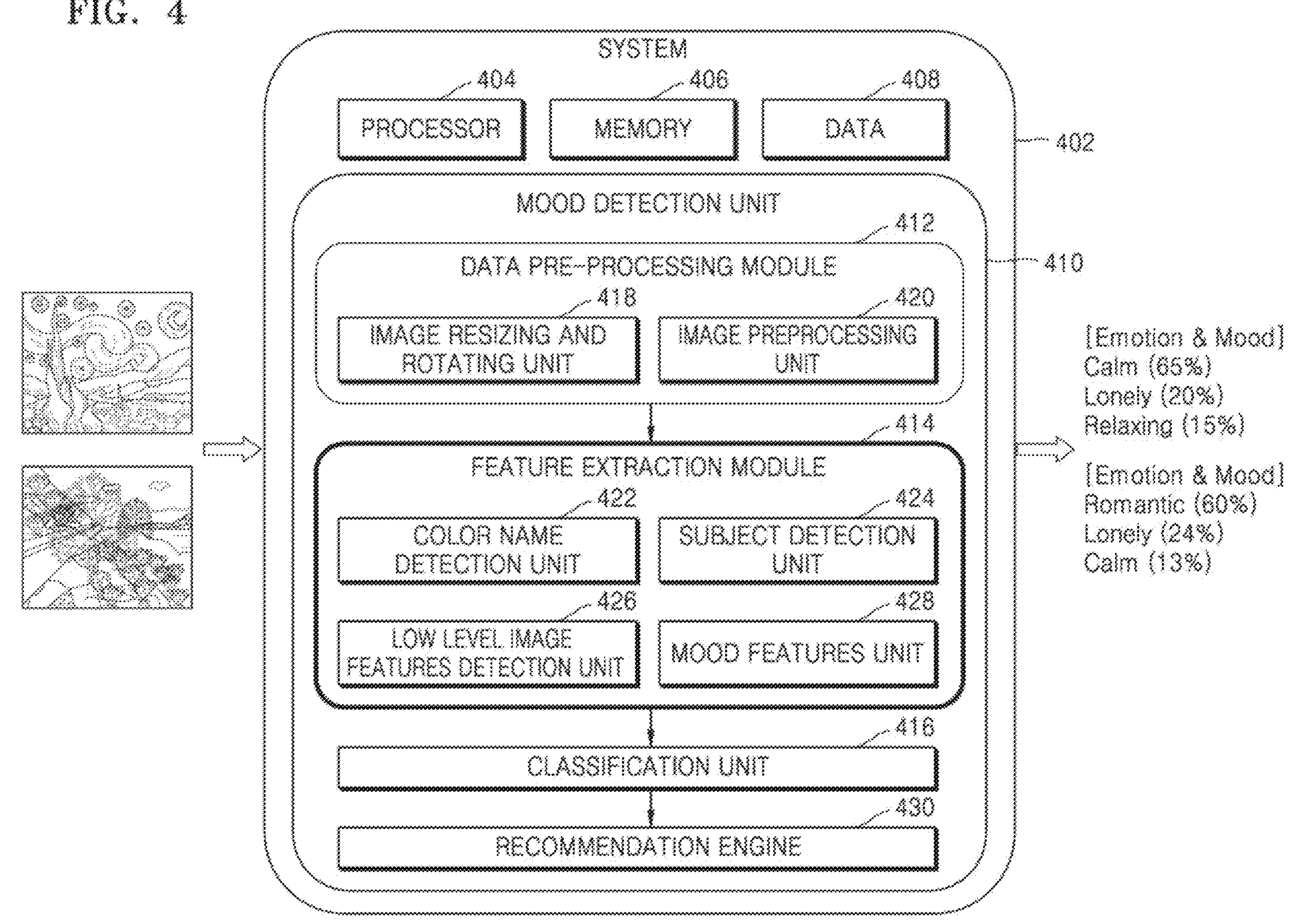
FIG. 4 illustrates a block diagram of a system for extracting sentiments or mood from art images, according to an embodiment.

FIG. 4 illustrates a block diagram of a system 402 for extracting sentiments or mood from art images according to an embodiment. In an embodiment, the system 402 may be incorporated in a User Equipment (UE). Examples of the UE may include, but are not limited to a television, a laptop, a tab, a smart phone, a Personal Computer (PC). Further, the system 402 may be configured to extract the one or more sentiments or mood from one or more art image associated with the one or more users. Details of the above aspects performed by the system 402 shall be explained below.

The system 402 includes a processor 404, a memory 406, and data 408. The processor may include at least one of a mood detection unit 410, a data preprocessing unit 412, a feature extraction unit 414, a classification unit 416 and a recommendation engine 430. In an embodiment, the processor 404, the memory 406, data 408, the mood detection unit 410, the data preprocessing unit 412, the feature extraction unit 414, the classification unit 416 and the recommendation engine 430 may be communicatively coupled to one another.

At least one of the pluralities of the mood detection unit 410 may be implemented through an artificial intelligence (AI) model. A function associated with AI may be performed through the non-volatile memory or the volatile memory, and/or the processor.

The processor 404 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

A plurality of processors controls the processing of the input data in accordance with a predefined operating rule or AI model stored in the non-volatile memory or the volatile memory. The predefined operating rule or artificial intelligence model is provided through training or learning. Here, being provided through learning means that, by applying a learning technique to a plurality of learning data, a predefined operating rule or AI model of a desired characteristic is made. The learning may be performed on a device itself in which AI according to an embodiment is performed, and/or may be implemented through a separate server/system. The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

According to an embodiment, in a method of an electronic device, a method of extracting sentiments or mood associated with one or more users with respect to one or more art image. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training technique. The artificial intelligence model may include a plurality of neural network layers. Each of the plurality of neural network layers includes a plurality of weight values and performs neural network computation by computation between a result of computation by a previous layer and the plurality of weight values.

Visual understanding is a technique for recognizing and processing things as does human vision and includes, e.g., object recognition, object tracking, image retrieval, human recognition, scene recognition, 3D reconstruction/localization, or image enhancement.

As would be appreciated, the system 402, may be understood as one or more of a hardware, a software, a logic-based program, a configurable hardware, and the like. In an example, the processor 404 may be a single processing unit or a number of units, all of which could include multiple computing units. The processor 404 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 404 may be configured to fetch and/or execute computer-readable instructions and/or data stored in the memory 406.

In an example, the memory 406 may include any non-transitory computer-readable medium known in the art including, for example, volatile memory, such as static random-access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 406 may include the data 408. The data 408 serves, amongst other things, as a repository for storing data processed, received, and generated by one or more of the processor 404, the memory 406, the data 408, the mood detection unit 410, the data preprocessing unit 412, the feature extraction unit 414, the classification unit 416 and the recommendation engine 430.

The mood detection unit 410, amongst other things, may include routines, programs, objects, components, data structures, etc., which perform particular tasks or implement data types. The mood detection unit 410 may also be implemented as, signal processor(s), state machine(s), logic circuitries, and/or any other device or component that manipulate signals based on operational instructions.

Further, the mood detection unit 410 may be implemented in hardware, as instructions executed by at least one processing unit, e.g., processor 404, or by a combination thereof. The processing unit may be a general-purpose processor that executes instructions to cause the general-purpose processor to perform operations or, the processing unit may be dedicated to performing the required functions. In an aspect of the present disclosure, the mood detection unit 410 may be machine-readable instructions (software) which, when executed by a processor/processing unit, may perform any of the described functionalities.

In some embodiments, the mood detection unit 410 may be machine-readable instructions (software) which, when executed by a processor 404, perform any of the described functionalities.

In an embodiment, the data preprocessing unit 412 may be configured to receive at least one of art image as an input image and preprocess the received input image. Further, the data preprocessing unit 412 may include an image resizing and rotating unit 418 and an image preprocessing unit 420. The image resizing and rotating unit 418 may be configured to preprocess the input image by perform resizing and rotation mechanism on the input image by reducing a size of the input image to a predefined size and rotating input image to at least one of 90 degrees clockwise, 90 degrees counterclockwise, and 180 degrees rotation. The image preprocessing unit 420 may be configured to convert input image into a grayscale and/or a binary scale for extracting the low-level features.

In an embodiment, the feature extraction unit 414 may be configured to extract processed input image features. The feature extraction unit 414 may include at least one of a color name detection unit 422, a subject detection unit 424, a low-level image features detection unit 426 and a mood features unit 428. The color name detection unit 422 may be configured to detect a dominant perceptual color from the processed input image based on a threshold range of a hue and a cone angle estimated through a regression model. The color name detection unit 422 may be also configured to predict a color label corresponding to the detected dominant perceptual color based on the detected dominant perceptual color. The subject detection unit 424 may be configured to detect a dominant subject from the processed input image. The low-level image features detection unit 426 may be configured to detect low-level image features from the processed input image. The low-level image features detection unit 426 may be further configured to extract Local binary patterns (LBP), a GIST feature, and Speeded-Up Robust Feature (SURF) based on the processed input, wherein the low-level image features include spatial information about edges and shapes of the input image. The mood features unit 428 configured to extract mood feature information based on a description information included in the input image. In an implementation, the mood feature information is extracted from a keyword present in the description information. The GIST feature refers to a low-dimensional global image descriptor widely used in computer vision for tasks such as scene recognition and image retrieval (see, e.g., "Modeling the shape of the scene: A holistic representation of the spatial envelope", A. Oliva and A. Torralba, International Journal of Computer Vision, May 1, 2001). A GIST descriptor captures the essential spatial structure and global layout of an image rather than focusing on local details. The term "GIST" originates from the expression "the gist of the scene", emphasizing its role in representing the fundamental global characteristics of an image. In other words, the GIST feature provides a compact yet informative summary of an image's overall content, enabling efficient differentiation and retrieval of visual scenes.

The classification unit 416 may be configured to classify the extracted features into a plurality of mood/sentiments classes, using an artificial neural network (ANN), to predict the mood or sentiments present in the input image based on the extracted dominant perceptual color and the classified plurality of mood/sentiments classes. The classification unit 416 may be further configured to map the extracted dominant perceptual color and low-level feature with respect to the classified plurality of the mood/sentiment classes. The classification unit 416 may be also configured to obtain a relationship between the extracted dominant perceptual color and low-level feature and corresponding classified plurality of the mood/sentiment classes based on the mapping. The classification unit 416 may be configured to predict the mood or sentiment present in the image based on the obtained relationship.

In an embodiment, the recommendation engine 430 may be configured to provide one or more suggestion based on the extracted mood or sentiment.

Figure 5:
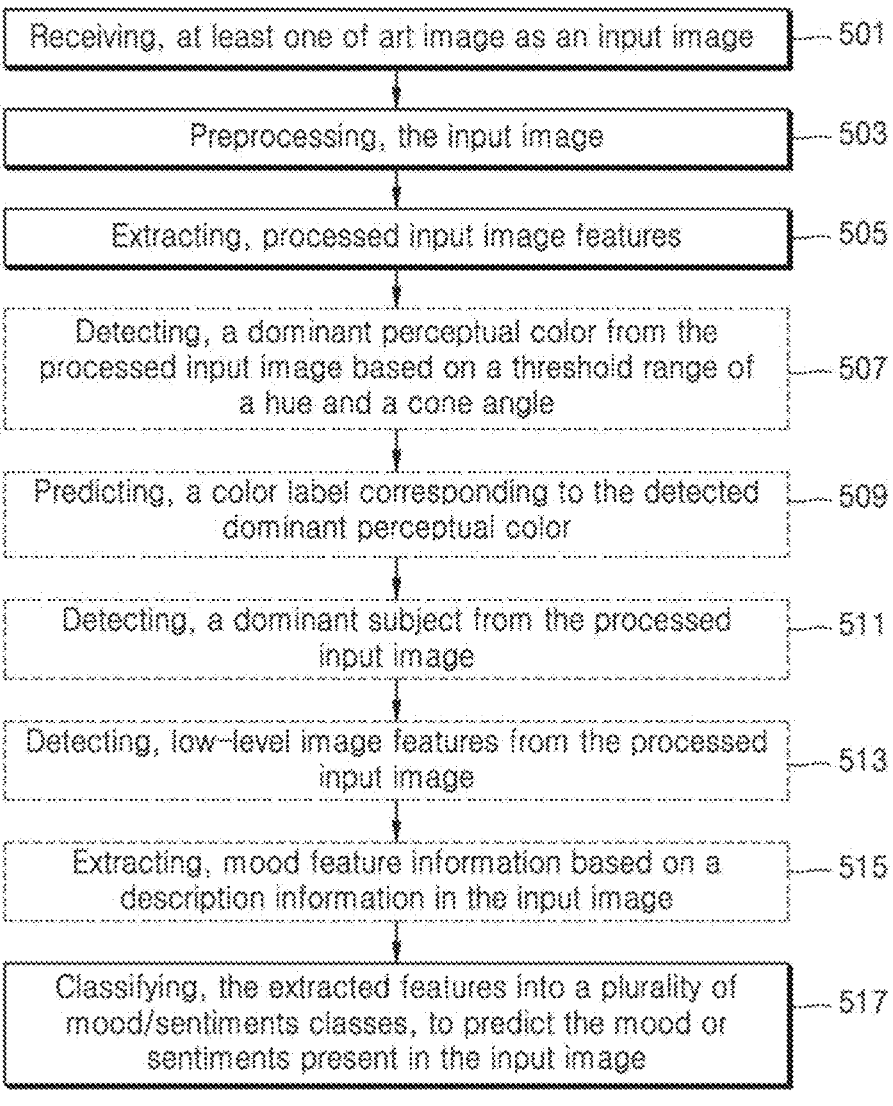
FIG. 5 illustrates a flow diagram depicting an embodiment of a method for extracting sentiments or mood from art images, according to an embodiment.

FIG. 5 illustrates an operational flow diagram depicting a method for extracting sentiments or mood from an art image, according to an embodiment. In an embodiment, the method may include receiving in operation 501, by the data preprocessing unit 412, at least one of art image as an input image. The method may include preprocessing in operation 503, by the data preprocessing unit 412, the input image. The preprocessing of the input image may include performing, by the data preprocessing unit 412, resizing and rotation mechanism on the input image by reducing a size of the input image to a predefined size and rotating input image to at least one of 90 degrees clockwise, 90 degrees counterclockwise, and 180 degrees rotation, and converting, by the data preprocessing unit 412, input image into a grayscale and/or a binary scale for extracting the low-level features.

The method may include extracting in operation 505, by the feature extraction unit 414, processed input image features. The method may include detecting in operation 507, by the color name detection unit 422, a dominant perceptual color from the processed input image based on a threshold range of a hue and a cone angle estimated through a regression model. The method may include predicting in operation 509, the color name detection unit 422, a color label corresponding to the detected dominant perceptual color based on the detected dominant perceptual color.

The method may include detecting in operation 511, by the subject detection unit 424, a dominant subject from the processed input image. The method may include detecting in operation 513, by the low-level image features detection unit 426, low-level image features from the processed input image. The method may include extracting at the operation 513, by the low-level image features detection unit 426, LBPs, a GIST feature, and SURF based on the processed input. Further, the low-level image features include spatial information about edges and shapes of the input image.

The method may include extracting in operation 515, by the mood features unit 428, mood feature information based on a description information included in the input image. The mood feature information may be extracted from a keyword present in the description information.

The method may include classifying in operation 517, by the classification unit 416, the extracted features into a plurality of mood/sentiments classes, using an ANN, to predict the mood or sentiments present in the input image based on the extracted dominant perceptual color and the classified plurality of mood/sentiments classes. The method for the predicting of the mood or sentiment may include mapping, by the classification unit 416, the extracted dominant perceptual color and low-level feature with respect to the classified plurality of the mood/sentiment classes. The method may include obtaining, by the classification unit 416, a relationship between the extracted dominant perceptual color and low-level feature and corresponding classified plurality of the mood/sentiment classes based on the mapping. The method may further include predicting, by the classification unit 416, the mood or sentiment present in the image based on the obtained relationship.

Figure 6:
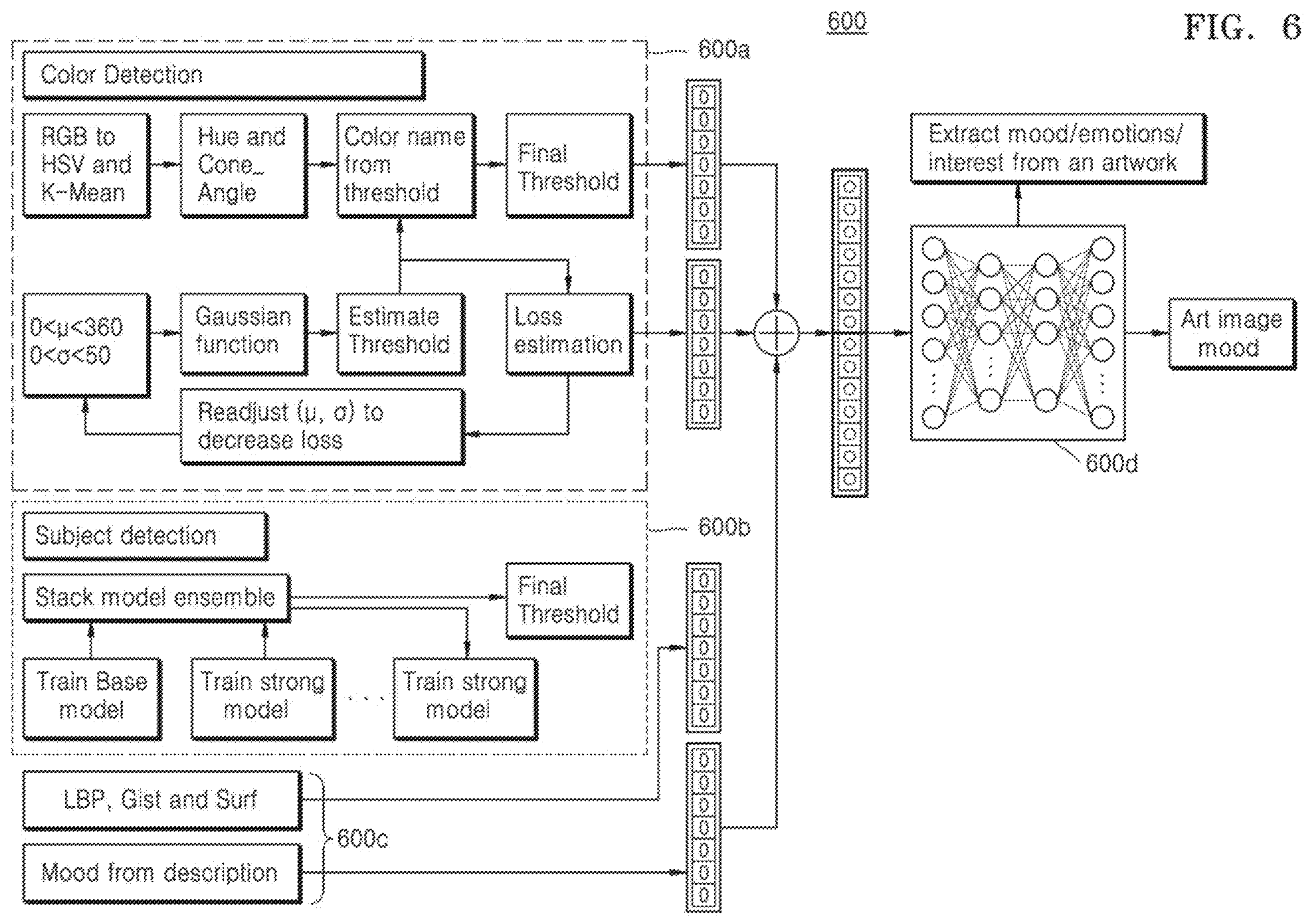
FIG. 6 illustrates a flow diagram depicting the embodiment of a method for extracting sentiments or mood from art images, according to an embodiment.

FIG. 6 illustrates a flow diagram 600 depicting the embodiment of a method for extracting sentiments or mood from art images, according to an embodiment. In an embodiment, the flow diagram 600 depicts generating mood, emotion, or interest from an artwork by finding co-relation between artwork features and emotions using combination of regression model approach to extract perceptual color using Hue and HSV cone angle threshold estimated from Gaussian distribution with color dependent varying mean and standard deviation and subject analysis using derived CNN model. The reference numeral 600*a* depicts method for extracting perceptual color from the artwork as per the embodiment. The reference numeral 600*b* depicts method for subject detection as per the embodiment. The reference numeral 600*c* depicts method for low feature detection and mood information detection as per the embodiment. The reference numeral 600*d* depicts method for extracting one or more of mood, emotion, or interest by combining the extracted color subject, low feature, and mood information, and using an ANN, for classification and prediction.

Figure 7:
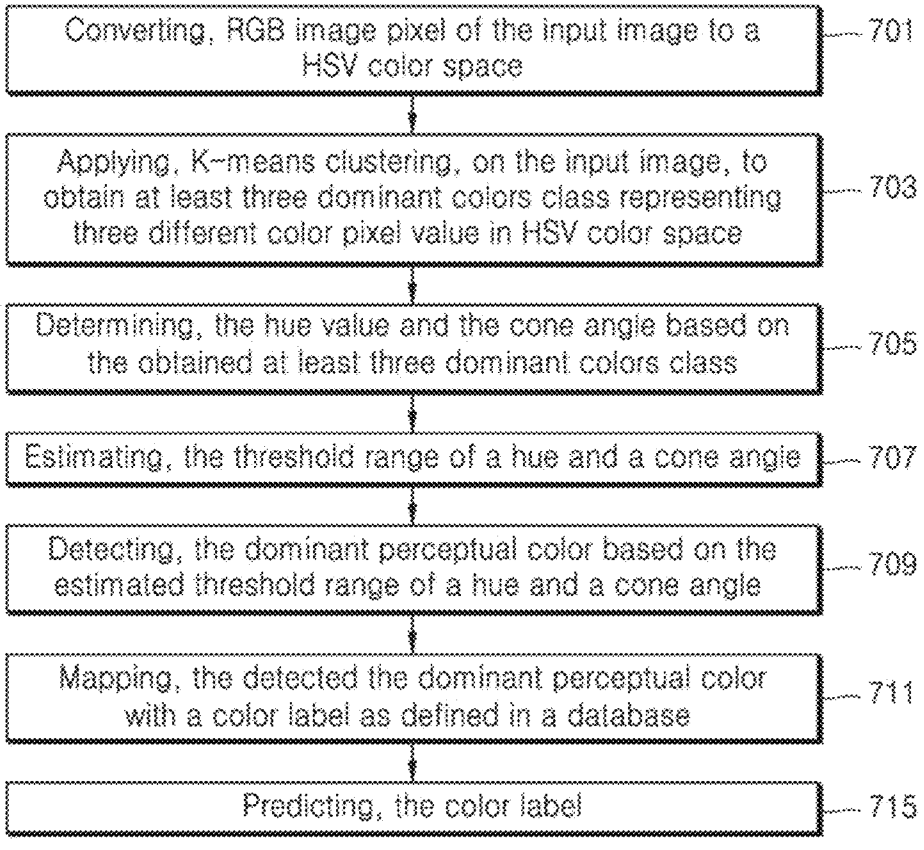
FIG. 7 illustrates a flow diagram depicting an embodiment of a method for extracting color from art images, according to an embodiment.

FIG. 7 illustrates an operational flow diagram depicting a method for predicting of the color label, according to an embodiment. The method may include converting in operation 701, by the color name detection unit 422, red, green, blue (RGB) image pixels of the input image to an HSV color space.

The method may include applying in operation 703, by the color name detection unit 422, k-means clustering mechanism, on the input image, to obtain at least three dominant colors classes representing three different color pixel values in HSV color space.

The method may include determining in operation 705, by the color name detection unit 422, the hue value and the cone angle based on the obtained at least three dominant colors classes, wherein the cone angle is determined based on a saturation and a value property of HSV color space, and the range of the hue value is determined through the regression model.

The method may include estimating in operation 707, by the color name detection unit 422, the threshold range of a hue and a cone angle by using the regression model based on the Gaussian probability distribution function.

The method may include detecting in operation 709, by the color name detection unit 422, the dominant perceptual color based on the estimated threshold range of a hue and a cone angle.

The method may include mapping in operation 711, by the color name detection unit 422, the detected dominant perceptual color with a color label as defined and stored in a predefined database, e.g., a memory.

The method may include predicting in operation 715, by the color name detection unit 422, the color label based on the mapping.

Figure 8:
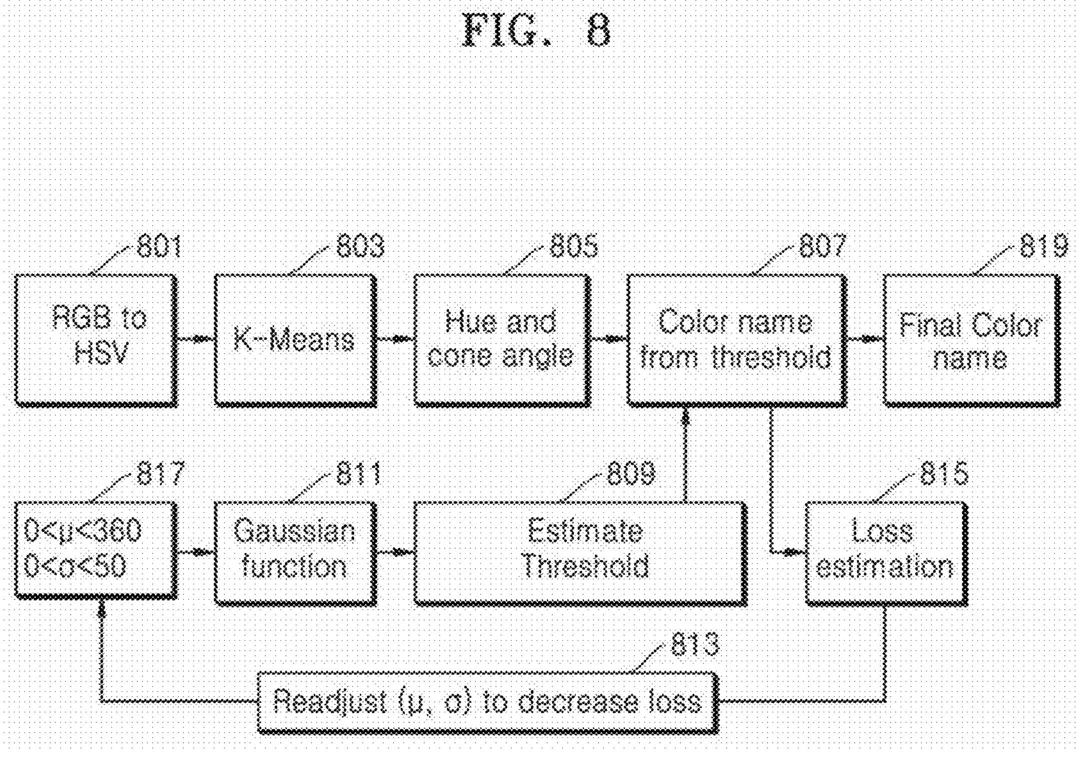
FIG. 8 illustrates a flow diagram depicting an embodiment of a method for extracting color from art images, according to an embodiment.

FIG. 8 illustrates a flow diagram 800 depicting an embodiment of a method for extracting color from art images, according to an embodiment. In the embodiment, the method may include in operation 801, convert RGB image pixels of the input image to an HSV color space. This operation corresponds to the operation 701. The method may include in operation 803, apply k-means clustering mechanism to HSV color space. This operation corresponds to the operation 703. The method may include in operation 805 determining the hue and cone angle. This operation corresponds to the operation 705. The method may include in operation 807, detection of color name after estimating threshold in operation 809 using Gaussian function in operation 811 and estimating loss by readjusting ($\mu$, $\sigma$) to decrease loss (operations 815, 813). The final color name may be determined in operation 819.

Figure 9:
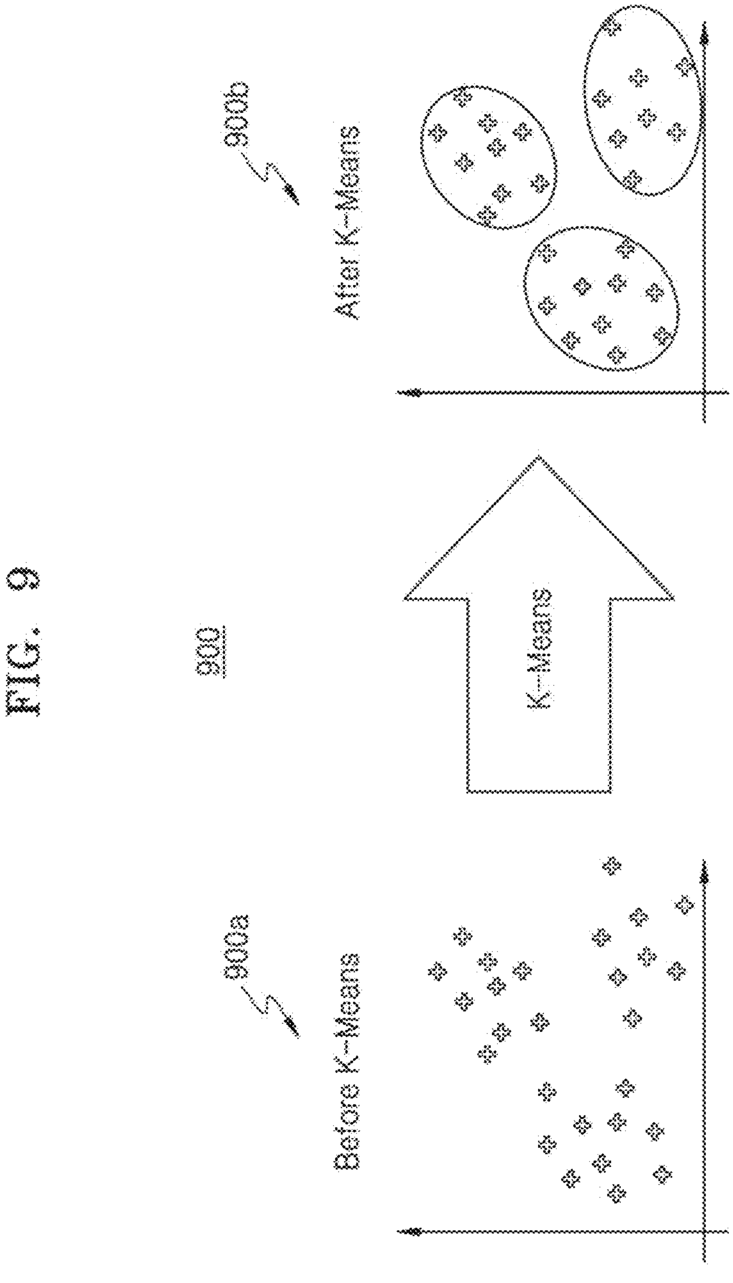
FIG. 9 illustrates a flow diagram depicting an embodiment of a method for applying k-means clustering mechanism to obtain at least three dominant colors classes, according to an embodiment.

FIG. 9 illustrates a flow diagram 900 depicting an embodiment applying k-means clustering mechanism to obtain at least three dominant colors classes, according to an embodiment. In an implementation, the color name detection unit 422 may be configured extract the top dominant colors in image by apply k-means clustering mechanism. This operation corresponds to the operation 703. Further, number of classes in k-means may be change based on requirement. The color name detection unit may be configured to extract top 3 colors. The reference numeral 900*a* depict different color pixel before k-means clustering. The reference numeral 900*b* depicts HSV centroids representing 3 different color pixel values in HSV color space after applying k-means clustering mechanism.

In an embodiment, method usage HSV color space which is defined in cylindrical coordinate system and is quite close to human perception. The method includes extracting cone out of cylinder which represents all of the colors, rest part of the cylinder is grayscale. The cone angle and direction are being used to find proper color. The regression model may be used to determine proper threshold for color and get the color name as labeled by the art experts.

Figure 10:
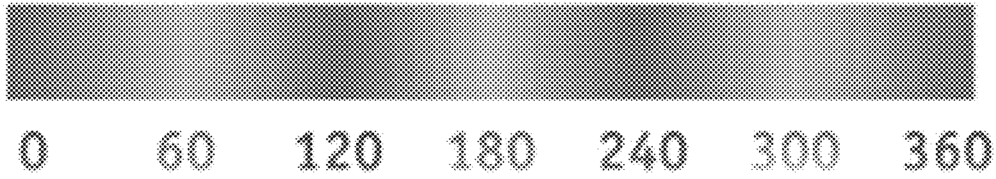
FIG. 10 illustrates a flow diagram depicting hue, saturation, value (HSV) color range, according to an embodiment.

FIG. 10 illustrates a diagram 1000 depicting HSV color range, according to an embodiment. The Hue contains all chrominance property of HSV color space, but it does not reflect color shades. It shows us pure color. Its value ranges from 0 to 360 degrees accommodating all visible spectrum. In art image, it is difficult to determine perceptual hue range of red, blue, green etc. The regression model is used to find correct color Hue range.

FIG. 11 illustrates a diagram 1100 depicting an embodiment of determination of the hue value and the cone angle, according to an embodiment. In an embodiment, the color name detection unit 422 may be configured to determine the color shades range by creating a cone angle property. This operation corresponds to the operation 705. Cone angle is created based on Saturation and Value property of HSV color space. The cone angle may be computed using equation 1.

$$\text{Cone } Angl = \frac{\text{Saturation}}{256 - \text{Value}} \quad \text{Equation 1}$$

In an embodiment, the color name detection unit 422 may be configured to extract the correct Hue and Cone Angle range threshold by using regression model approach. This operation corresponds to the operation 709. The color name detection unit 422 may be configured to use normal Gaussian probability distribution function with varying mean and variance as a regression model. The Gaussian probability distribution function may be computed by using equation 2.

$$g(x) = \frac{1}{\sigma\sqrt{2\pi}} \exp\left(-\frac{1}{2}\frac{(x-\mu)^2}{\sigma^2}\right) \quad \text{Equation 2}$$

The reason to choose Gaussian function is that most of color intensity follow the normal Gaussian distribution function. All the color follows this distribution with different mean and variance. Hue and Cone Angle also follow the same distribution. That mean at a certain value the color intensity is more and as we go far away from that value it decreases.

FIG. 12 illustrates a diagram 1200 depicting an embodiment of the visible spectrum, according to an embodiment.

Figure 13:
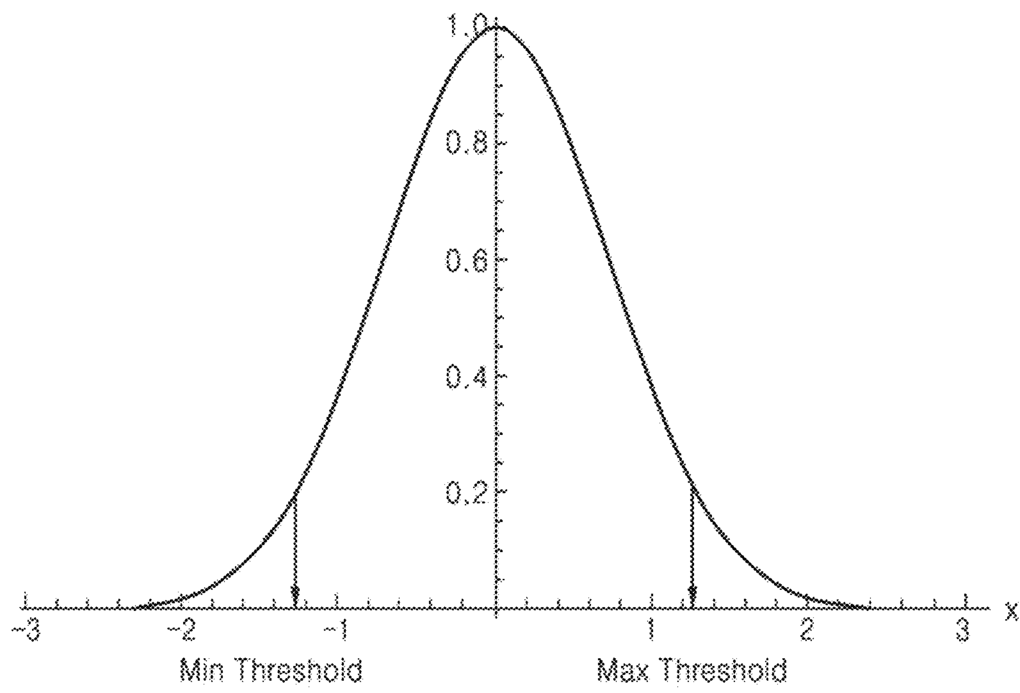
FIG. 13 illustrates a graph depicting color threshold range for selecting Gaussian intensity, according to an embodiment.

FIG. 13 illustrates a graph depicting color threshold range for selecting Gaussian intensity, according to an embodiment. To choose correct mean (μ) and variance (σ) and avoid the overlap of color threshold range, the color name detection unit 422 may be configured to choose 80% Gaussian intensity. This can be changed bases on requirement and use. The Minimum (x) and Maximum (x) may be computed by using equation 3.

$$\text{Minimum}(x) = \text{Min}(Gaus(x, \mu, \sigma) \geq 20\%) \quad \text{Equation 3}$$

$$\text{Maximum}(x) = \text{Min}(Gauss(x, \mu, \sigma) \geq 20\%)$$

Mean square error loss function is chosen to estimate the loss but can be used any loss function. So, the regression model tries to find optimal minimum and maximum x value such that loss decreases for all (μ, σ). X value here can be Hue are cone angle. The mean square error may be computed using equation 4.

$$MSE = \frac{\sum_{i=1}^{n}(y_i - y_i^p)^2}{n} \quad \text{Equation 4}$$

Figure 14A:
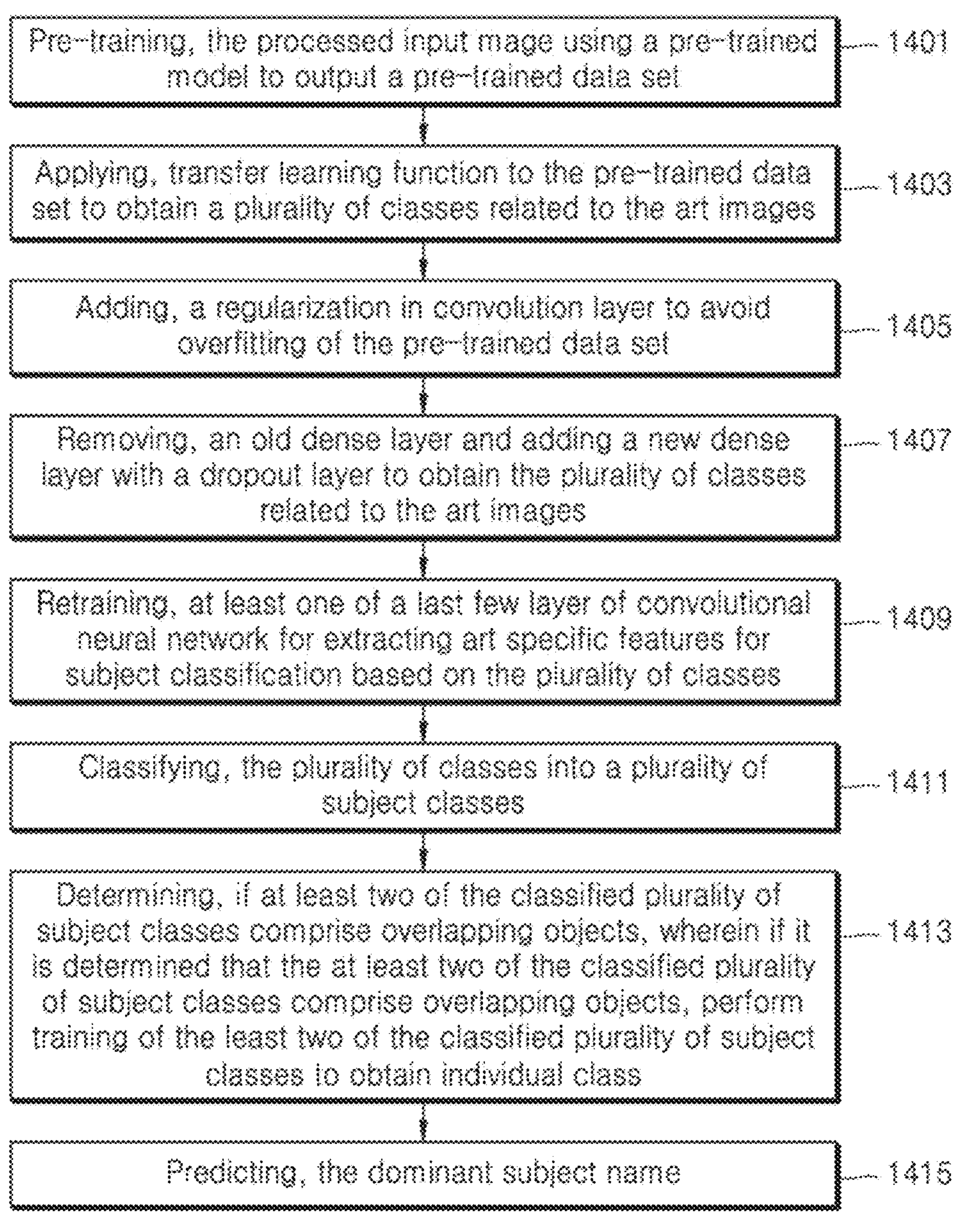
FIG. 14A illustrates an operational flow diagram depicting a method for detecting of the dominant subject, according to an embodiment.

FIG. 14A illustrates an operational flow diagram 1400 depicting a method for detecting of the dominant subject, according to an embodiment. The method may include pre-training in operation 1401, by the subject detection unit 424, the processed input image using a pre-trained model to output a pre-trained data set.

The method may include applying in operation 1403, by the subject detection unit 424, transfer learning function to the pre-trained data set to obtain a plurality of classes related to the art images. The application of the transfer learning function may include adding in operation 1405, by the subject detection unit 424, a regularization in convolution layer to avoid overfitting of the pre-trained data set. The method may include removing in operation 1407, by the subject detection unit 424, an old dense layer and adding a new dense layer with a dropout layer to obtain the plurality of classes related to the art images.

The method may include retraining in operation 1409, by the subject detection unit 424, at least one of last few layers of convolutional neural network for extracting art specific features for subject classification based on the plurality of classes.

The method may include classifying in operation 1411, by the subject detection unit 424, the plurality of classes into a plurality of subject classes via execution of the trained convolutional neural network for the subject classification based on the extracted art specific features. The method may include determining in operation 1413, by the subject detection unit 424, if at least two of the classified plurality of subject classes includes overlapping objects, wherein if it is determined that the at least two of the classified plurality of subject classes includes overlapping objects, perform training of the least two of the classified plurality of subject classes to obtain individual class.

Subsequently, the method may include predicting in operation 1415, by the subject detection unit 424, the dominant subject name based on the determination.

FIG. 14B illustrates a table depicting an embodiment of modification convolutional neural network model for subject classification, according to an embodiment. The convolutional neural network model such as VGG16 network is trained for 1000 different classes, but in art subject classification one art may contain multiple objects. The convolutional neural network model such as VGG16 is trained on ImageNet dataset, which is photographic images, not on art images. Since the objects in art are not very much different from base VGG16 trained model. The subject detection unit 424 may be configured to use initial few layers of base model as it is. In art images edges of object not as sharp as in photographic images. To acquire this property and combining multiple objects in an image, the subject detection unit 424 may be configured to make few changes in last few layers:

Adding regularization in convolution layer to avoid overfitting. This operation corresponds to the operation 705.

Removing old dense layer and added new dense layers with dropout layer. The subject detection unit classifying, network for art subject which is very few classes than original classes (1000). This operation corresponds to the operation 707.

Retraining last few layers including some convolution layers, so that it extracts art specific features. This operation corresponds to the operation 709.

If two subject classes have overlapping objects and prediction precision is low, then we train other model for these two classes.

FIG. 14C illustrates a table depicting an embodiment of last few modified/changed layers of convolutional neural network model, according to an embodiment.

Figure 15A:
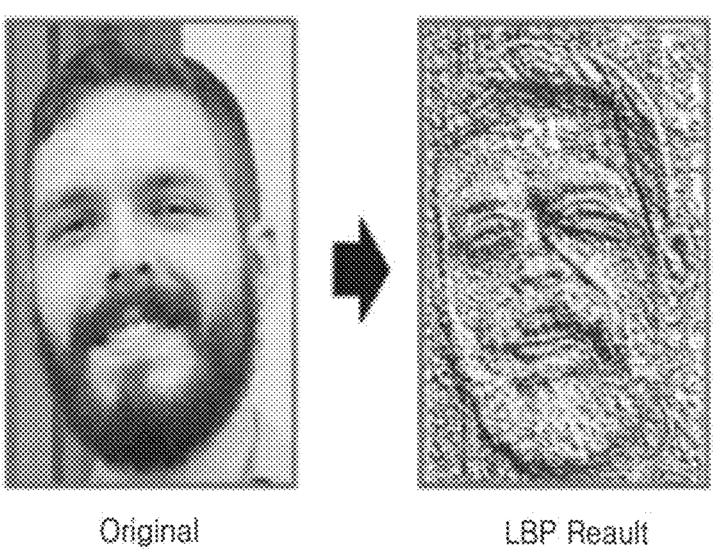
FIGS. 15A and 15B illustrate a flow diagram depicting an embodiment of method of low-level features detection, according to an embodiment.
Figure 15B:

FIGS. 15A and 15B illustrate a flow diagram depicting an embodiment of method of low-level features detection, according to an embodiment. In an embodiment, the system 402 is configured to extract few more feature apart from perceptual color name and subject from art image and description. The low-level image features detection unit 426 may be configured to extract LBPs, a GIST feature, and SURF based on the processed input, wherein the low-level image features include spatial information about edges and shapes of the input image. FIG. 15A represents extraction of LBPs from the art image by the low-level image features detection unit 426. FIG. 15B represents extraction of SURF using some open python library by the low-level image features detection unit 426. This feature contains lots of spatial information present in art image which can be useful for mood detection.

In an embodiment, the mood features unit 428 may be configured to mood feature information is extracted from a keyword present in the description information. The art description also contains some of the mood information. This can be extracted from key word present in image description. Table 1 represent a non-limiting example of keyword associated with mood information.

TABLE 1

| Class | Labels |
|---|---|
| Happiness | happy |
| sadness | sad |
| Anger | angry |
| | infuriated |
| | pissed off |
| | enraged |
| | irate |
| Surprise | surprised |
| | amazed |
| | impressed |
| | shocked |
| Fear | scared |
| | afraid |
| | worried |
| | anxious |
| | nervous |
| Disgust | disgusted |
| | appalled |
| | displeased |
| | fed up |
| | repulsed |
| | revolted |
| | scandalized |
| | sickened |
| | sick and tired |
| | turned off |
| | ew |
| | yuck |

Figure 16:
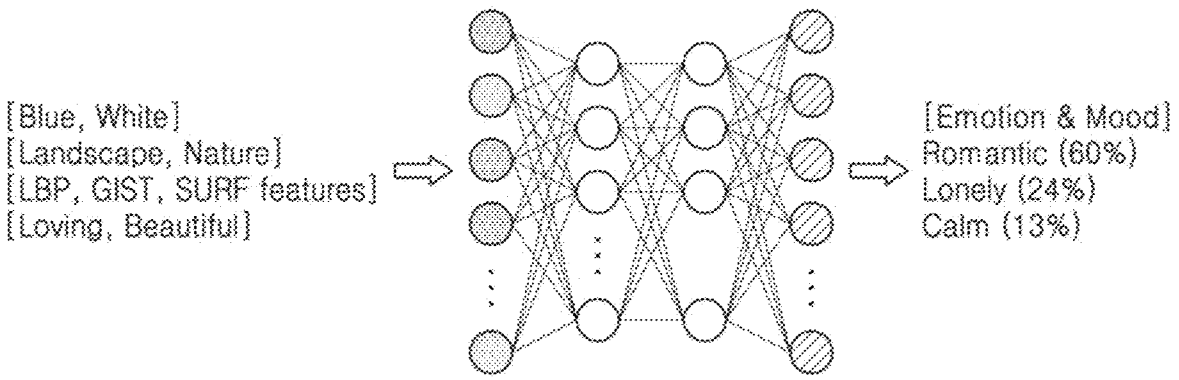
FIG. 16 illustrates a flow diagram depicting an embodiment of method of features classification by a classification unit, according to an embodiment.

FIG. 16 illustrates a flow diagram depicting 1600 an embodiment of method features classification by a classification unit, according to an embodiment. In an embodiment, the extracted features are being passed to classification unit 416 to classify the features into Mood/Emotion. The classification unit 416 may contain three or four layers depending on dataset and requirement. Final classified result can be top two or top three based on requirement. Table 2 represent a non-limiting example of color and mood relationship.

TABLE 2

| Color | Moods |
|---|---|
| Black | Tense, nervous, harassed, overworked |
| Gray | Anxious, nervous, strained |
| Amber | Nervous, emotions mixed, unsettled, cool |
| Green | Average reading, Active, not stressed |
| Blue-green | Emotionally charged, somewhat relaxed |
| Blue | Relaxed, at ease, calm |
| Dark blue | Anger, tense |
| Red | Love |
| Victorian Red (Dark Red/Blood Red) | Anger, Hatred |

Further, the low-level features such as LBP, GIST, and SURF reflect spatial information about edges and shapes. Spatial orientation has such a deep effect on user emotional experience that there are ancient practices centered around such an idea. Feng Shui is the ancient Chinese practice of spatial arrangement in effort to achieve certain emotional or mood state by properly aligning the objects. Table 3 represents a non-limiting example of relationship of shapes and moods.

TABLE 3

| Shapes | Moods |
|---|---|
| Elevation | authority, subordination, oppression, helplessness, empowerment |
| Horizontal | helplessness, placidity, calm |
| Clutter | anxious, overwhelmed, out of control, irritable, aggressive, stress |
| Barren | calm, sad, boredom |

Subject of art can be identified by many means such as object inside art or event happening in art images. Based on these properties certain mood is triggered. Table 4 represent a non-limiting example of subject relationship with moods.

TABLE 4

| Subject | Positive moods | Negative moods |
|---|---|---|
| On object properties | Interest, curiously, enthusiasm | Indifference, habituation, boredom |
| | Attraction, desire, admiration | Aversion, disgust, revulsion |
| | Surprise, amusement | Alarm, panic |
| Future appraisal | Hope, excitement | Fear, anxiety, dread |
| Event-related | Gratitude, thankfulness | Anger, rage |
| | Joy, elation, triumph, jubilation | Sorrow, grief |
| | Patience | Frustration, restlessness |
| | Contentment | Discontentment, disappointment |
| Self-appraisal | Humility, modesty | Pride, arrogance |
| Social | Charity | Avarice, greed, miserliness, envy, jealously |
| | sympathy | Cruelty |
| Cathected | Love | Hate |

Figure 17:
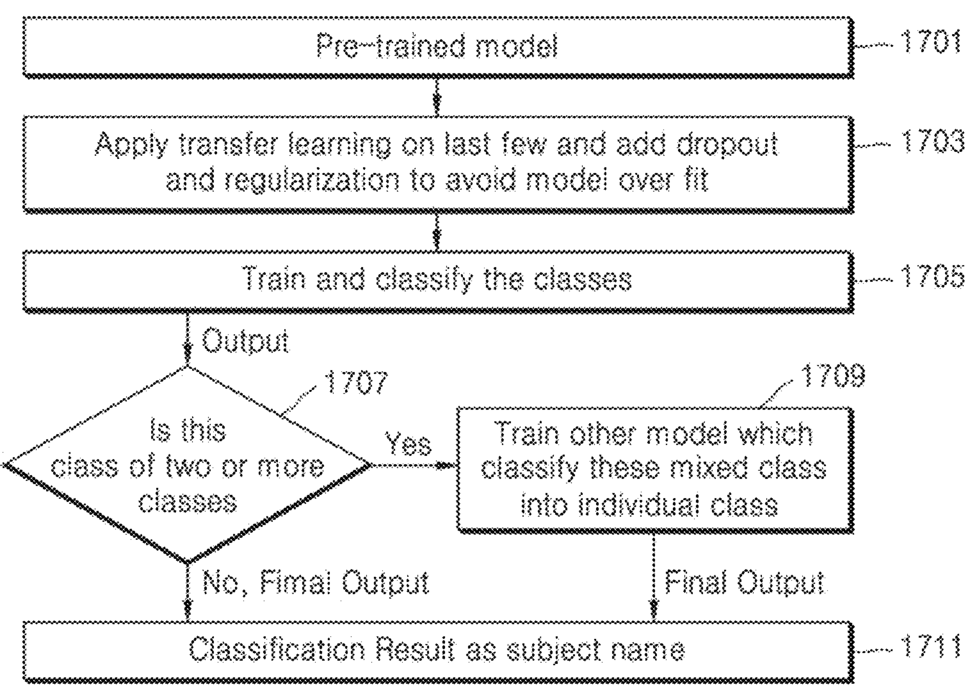
FIG. 17 illustrates an operational flow diagram depicting an embodiment of method of subject classification using specific base model and changed layers, according to an embodiment.

FIG. 17 illustrates an operational flow diagram depicting an embodiment of method of subject classification using specific base model and changed layers, according to an embodiment. The method may include using in operation 1701, pre-trained model, by the subject detection unit 424. The base model may be MobileNet V1, Inception V3, etc., instead of VGG16. The method may further include retraining in operation 1703, by the subject detection unit 424, by modifying last few layers, add dropout and regularization to avoid model over-fit and retrain last few layers including some convolution layers, to extract art specific features. This operation corresponds to the operation 1409.

The method may include classifying in operation 1705, the plurality of classes into a plurality of subject classes via execution of the trained convolutional neural network for the subject classification based on the extracted art specific features. This operation corresponds to the operation 1411.

The method may include determining in operation 1707, by the subject detection unit 424, if at least two of the classified plurality of subject classes include overlapping objects, wherein if it is determined that the at least two of the classified plurality of subject classes include overlapping objects, perform training of the least two of the classified plurality of subject classes to obtain individual class. This operation corresponds to the operation 1413. In operation 1711, classification result as a subject name is determined.

The method may include training in operation 1709, by the subject detection unit 424, the other model, which may classify mixed class into the individual class.

FIG. 18 illustrates an operational flow diagram 1800 depicting an embodiment of method of subject classification using model ensemble approach, according to an embodiment. In an embodiment, the model ensemble approach may be used to classify the subject of art image. The method may include in operation 1801 using, by the subject detection unit 424, a weak learner model as base model which is trained on all relevant classes. The method may include in operation 1803 training, by the subject detection unit 424, strong models on classes with low variance i.e., overlapping classes whose results are going to each other. Strong models are binary or ternary models having low variance in data set. Stacking approach is used to ensemble the model. The method may include detecting in operation 1805, by the subject detection unit 424, the final classified subject name.

Figure 19A:
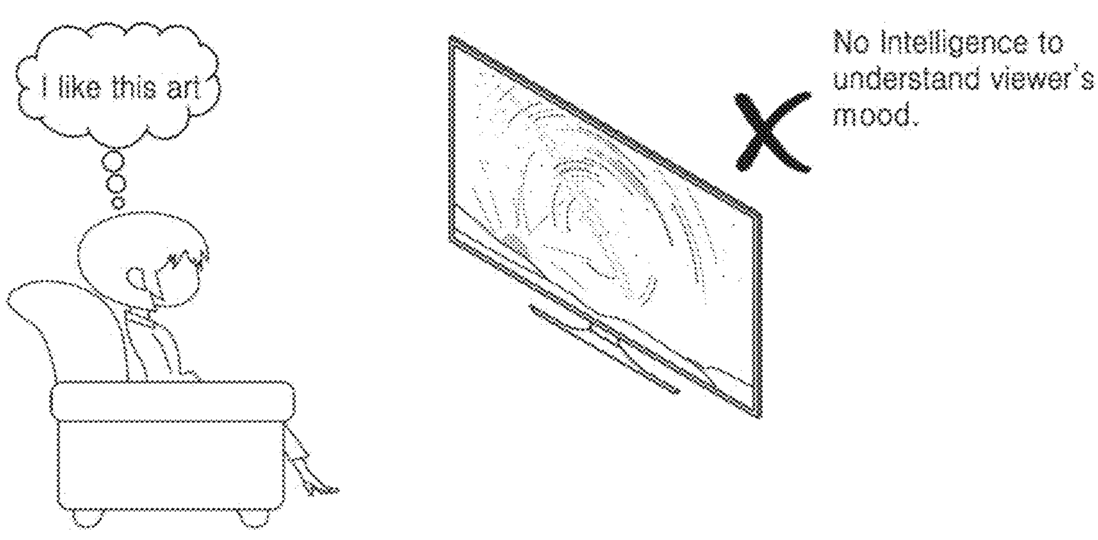

FIGS. 19A, 19B, 19C, and 19D illustrate the comparison between related art way of providing recommendation service, and manual tagging of mood metadata, and the recommendation service based on extracted mood, and auto tagging of mood metadata, according to an embodiment. In an embodiment, the method includes recommending, by a recommendation engine 430, suggestions based on the extracted one or more mood or sentiment. For example, FIG. 19A depicts the related art way of providing recommendation service. In the related art way, user mood is extracted based on the recent watching history of artworks and it is not possible to make recommendation for the user based on the user's current mood. However, FIG. 19B depicts the method for providing recommendation service, according to an embodiment. The user is sitting on couch and interested in a set of artworks. The system 402 may be configured to extract user mood based on the recent watching history of artworks. Further, the recommendation engine 430 may be configured to make recommendation based on extracted mood results for more personalized services. As a result, user may be happy with the provided recommendations and selects one from the list and starts watching.

Figure 19C:
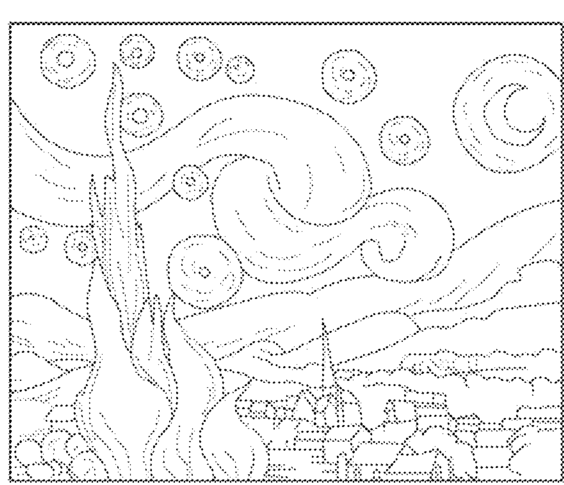
Figure 19D:
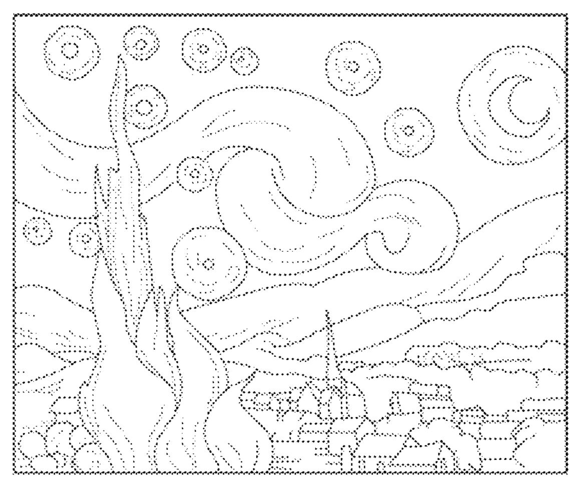

In an example, FIG. 19C depicts the scenario of manual tagging of mood metadata. Manual tagging is varying art to art, and it depends on the person who are tagging currently. The related art technique include manual tagging or manual metadata generation. The little difference in understanding of arts may lead to deviation in tagging done by different curators. The related art technique also requires extra manpower, and cost associated with it. FIG. 19D depicts scenario of auto tagging of mood metadata according to an embodiment. The system 402 may be implemented to automatic generate metadata for arts. The system 402 may replace manual tagging by automatic tagging of subject or color. There is no chance for human mistake in tagging and provide better recommendation to the user.

FIG. 20 illustrates an operational flow diagram 2000 depicting method for providing user choice and enhancing user experience, according to an embodiment. In an embodiment, the system 402 may be implemented to enhance user experience to explore art store of electronic device. In an implementation, the system 402 may be configured to understand user interest and provide one or more suggestion based on user's interest from history to meet user's choice 1. Further, search option can be provided to find content based on user's mood, e.g., "Romantic arts", "Dreamy arts" etc., to meet user's choice 2.

FIG. 21 illustrates an operational flow 2100 diagram depicting method for mood transfer over multi device, according to an embodiment. In an embodiment, the system 402 may be implemented to provide mood transfer over a multi device environment. In an implementation, the system 402 may be configured to extract of user mood based on watching & preview the variety of artworks. The system 402 may be configured to transfer user mood over the multi device environment to all user's personal devices. The recommendation engine 430 may be configured to provide personalized content recommendation comes on user devices linked with user profile.

For example, user is watching or previewing artwork on TV. User tries to watch same type of arts which represent its mood. Reference numeral 2100*a* depicts, user current mood is identified as "Romantic" by the system 402 due to watched or previewed artworks on the electronic device. User's extracted mood may be shared over the home network to other devices in the home environment. Further, after the mood transfer when user entered in living room & interact with smart speaker. The smart speaker identifies the user and welcome the user with romantic songs list based on transferred mood or sentiment as depicted by reference numeral 2100*b*. In a case, when user start browsing its mobile phone, the recommendation engine 430 may recommend romantic movies and songs on the mobile as depicted by reference numeral 2100*c*.

Figure 22:
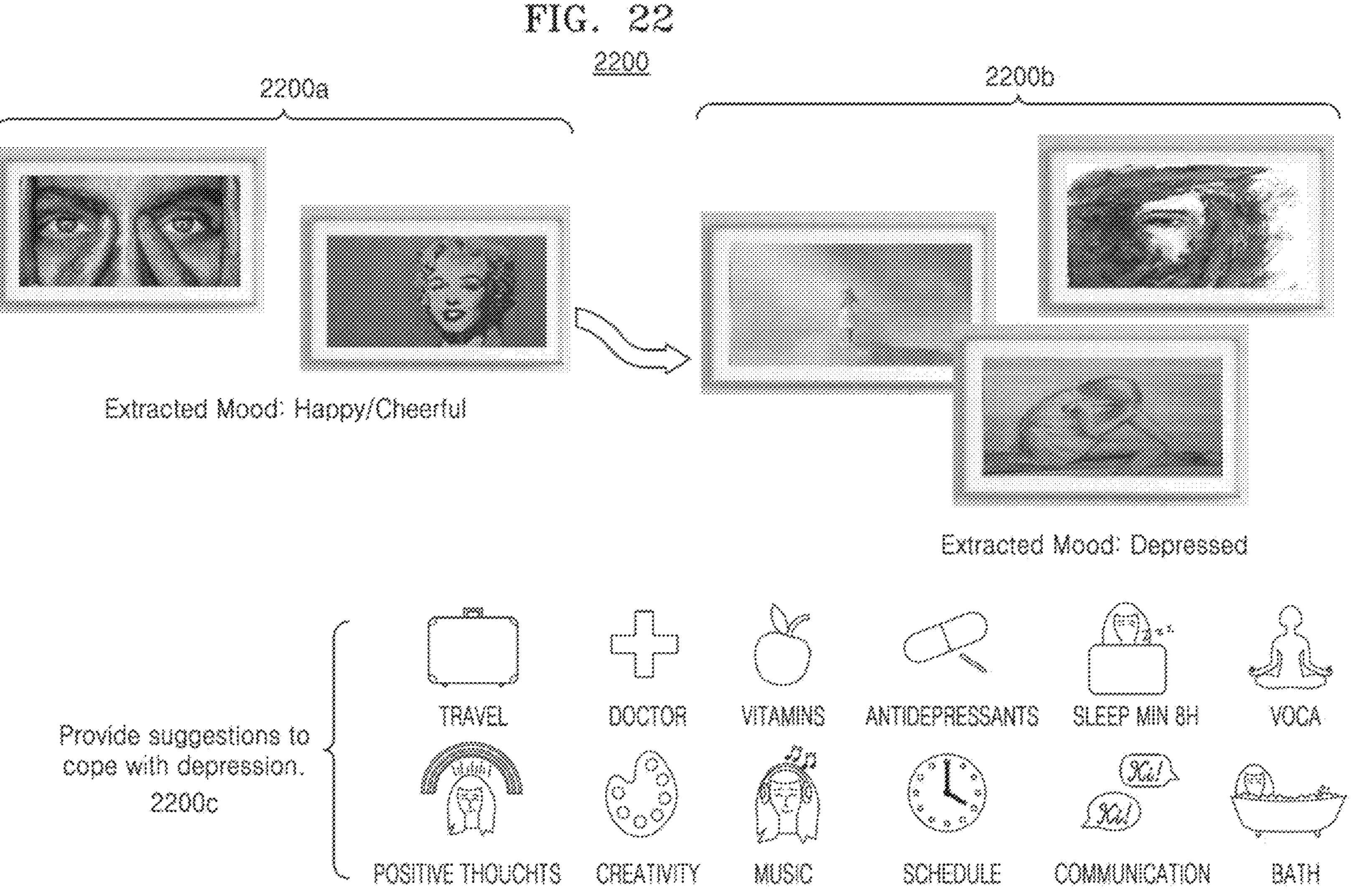
FIG. 22 illustrates an operational flow diagram depicting method for providing suggestions to cope with depression, according to an embodiment.

FIG. 22 illustrates an operational flow diagram 2200 depicting method for providing suggestions to cope with depression, according to an embodiment. In an embodiment, the system 402 may be configured to observe that user has changed his pattern to choose arts to set over electronic device as depicted by reference numeral 2200*a*. The recommendation engine 430 may be configured to prepare user's pattern over a period to know usual behavior of a user as depicted by reference numeral 2200*b*. The usual behavior pattern of user may include happy, joy, cheerful over a period. In case of change of detected mood or sentiment by the system 402, or the extracted mood is associated with depression, then the recommendation engine 430 provide one or more suggestions to cope with depression as depicted by reference numeral 2200*c*. The suggestion may include at least one of travel, doctor, recommended vitamin, antidepressant, yoga, positive thoughts, creativity, music, communication, bath etc.

As described herein, an embodiment may:

Enhance personalized art service by extracting mood or sentiments from an artwork, Increase cost saving by removing the dependency of third party by automatically creating the mood metadata along with color and subject, and Provide more accurate metadata generation than third party where metadata creation heavily depends on the person who create mood, color & subject metadata by seeing the images individually.

Various embodiments may be implemented or supported by one or more computer programs, which may be formed from computer-readable program code and embodied in a computer-readable medium. Herein, application and program refer to one or more computer programs, software components, instruction sets, procedures, functions, objects, class, instance, and related data, suitable for implementation in computer-readable program code. Computer-readable program code may include various types of computer code including source code, object code, and executable code. Computer-readable medium may refer to read only memory (ROM), RAM, hard disk drive (HDD), compact disc (CD), digital video disc (DVD), magnetic disk, optical disk, programmable logic device (PLD) or various types of memory, which may include various types of media that can be accessed by a computer.

In addition, the device-readable storage medium may be provided in the form of a non-transitory storage medium. The non-transitory storage medium is a tangible device and may exclude wired, wireless, optical, or other communication links that transmit temporary electrical or other signals. On the other hand, this non-transitory storage medium does not distinguish between a case in which data is semi-permanently stored in a storage medium and a case in which data is temporarily stored. For example, the non-transitory storage medium may include a buffer in which data is temporarily stored. Computer-readable media can be any available media that can be accessed by a computer and can include both volatile and nonvolatile media, removable and non-removable media. Computer-readable media includes media in which data can be permanently stored and media in which data can be stored and later overwritten, such as a rewritable optical disk or a removable memory device.

According to an embodiment, the method may be provided as included in a computer program product. Computer program products may be traded between sellers and buyers as commodities. The computer program product is distributed in the form of a machine-readable storage medium (e.g., CD-ROM), or is distributed between two user devices (e.g., smart phones) directly or through online (e.g., downloaded or uploaded) via an application store. In the case of online distribution, at least a portion of the computer program product (e.g., a downloadable app) may be temporarily stored or created in a device-readable storage medium, such as a memory of a manufacturer's server, a server of an application store, or a relay server.

According to an aspect of the disclosure, there is provided a method for extracting sentiments or mood from art images, the method may include receiving, at least one of the art images as an input image. The method may include preprocessing the input image. The method may include extracting features from the preprocessed input image. The extracting may include predicting a color label corresponding to a dominant perceptual color detected from the preprocessed input image. The extracting may include detecting a dominant subject from the preprocessed input image. The extracting may include detecting, low-level image features from the preprocessed input image. The extracting may include extracting mood feature information based on a description information included in the input image. The method may include classifying the extracted features into a plurality of mood/sentiments classes, using an artificial neural network. The method may include predicting, at least one of a mood or a sentiment that is present in the input image based on the dominant perceptual color and the plurality of mood/sentiments classes.

The preprocessing the input image may include performing resizing and rotation on the input image by reducing a size of the input image to a predefined size and rotating the input image to at least one of 90 degrees clockwise, 90 degrees counterclockwise, or 180 degrees. The preprocessing the input image may include converting the input image into at least one of a grayscale or a binary scale for extracting the low-level image features.

The predicting the color label may include converting RGB image pixels of the preprocessed input image to an HSV color space. The predicting the color label may include applying k-means clustering on the HSV color space, to obtain at least three dominant colors classes representing three different color pixel values in the HSV color space, respectively. The predicting the color label may include determining a hue value and a cone angle based on the at least three dominant colors classes. The cone angle may be determined based on a saturation and a value property of the HSV color space. A range of the hue value may be determined through a regression model. The predicting the color label may include estimating a threshold range of the hue value and the cone angle by using the regression model based on a Gaussian probability distribution function. The predicting the color label may include detecting the dominant perceptual color based on the threshold range of the hue value and the cone angle. The predicting the color label may include mapping the dominant perceptual color with a reference color label as defined and stored in a database; and predicting the color label based on the mapping.

The detecting the dominant subject may include pre-training the preprocessed input image using a pre-trained model to output a pre-trained data set. The detecting the dominant subject may include applying a transfer learning function to the pre-trained data set to obtain a plurality of classes related to the art images. The applying the transfer learning function may include adding a regularization in convolution layer to avoid overfitting of the pre-trained data set. The applying the transfer learning function may include removing an old dense layer and adding a new dense layer with a dropout layer to obtain the plurality of classes related to the art images. The method may include retraining at least one of last few layers of convolutional neural network (CNN), to extract art specific features for subject classification based on the plurality of classes. The method may include classifying the plurality of classes into a plurality of subject classes via execution of a trained CNN for the subject classification based on the art specific features. The method may include determining whether at least two of the plurality of subject classes include overlapping objects. The method may include, based on the determining that the at least two of the plurality of subject classes include the overlapping objects, performing training of the least two of the plurality of subject classes to obtain an individual class. The method may include predicting a dominant subject name based on the individual class.

The detecting the low-level image features may include extracting at least one of Local binary patterns, a GIST feature, or Speeded-Up Robust Feature based on the preprocessed input image. The low-level image features may include spatial information about edges and shapes of the input image.

The extracting the mood feature information may include extracting the mood feature information from a keyword present in the description information.

The predicting the at least one of the mood or the sentiment may include mapping the dominant perceptual color and the low-level image features with respect to the plurality of mood/sentiments classes. The predicting the at least one of the mood or the sentiment may include obtaining a relationship between the dominant perceptual color, the low-level image features. The predicting the at least one of the mood or the sentiment may include the plurality of mood/sentiments classes, respectively, based on the mapping; and predicting the at least one of the mood or the sentiment that is present in the input image based on the obtained relationship.

The method may include providing, a recommendation based on the at least one of the mood or the sentiment.

According to an aspect of the disclosure, there is provided a system for extracting sentiments or mood from art images. The system may include at least one processor. The at least one processor may be configured to receive at least one of the art images as an input image. The at least one processor may be configured to preprocess the input image. The at least one processor may be configured to extract features from the preprocessed input image. The at least one processor may be configured to predict a color label corresponding to a dominant perceptual color detected from the preprocessed input image. The at least one processor may be configured to detect a dominant subject from the preprocessed input image. The at least one processor may be configured to detect low-level image features from the preprocessed input image. The at least one processor may be configured to extract mood feature information based on a description information included in the input image. The at least one processor may be configured to classify the extracted features into a plurality of mood/sentiments classes, using an artificial neural network, to predict at least one of a mood or a sentiment that is present in the input image based on the dominant perceptual color and the plurality of mood/sentiments classes.

The at least one processor may be configured to perform resizing and rotation on the input image by reducing a size of the input image to a predefined size and rotating the input image to at least one of 90 degrees clockwise, 90 degrees counterclockwise, or 180 degrees. The at least one processor may be configured to convert the input image into at least one of a grayscale or a binary scale for extracting the low-level image features.

The at least one processor may be configured to convert RGB image pixels of the preprocessed input image to an HSV color space. The at least one processor may be configured to apply k-means clustering on the HSV color space, to obtain at least three dominant colors classes representing three different color pixel values in the HSV color space, respectively. The at least one processor may be configured to determine a hue value and a cone angle based on the at least three dominant colors classes. The cone angle may be determined based on a saturation and a value property of the HSV color space. A range of the hue value may be determined through a regression model. The at least one processor may be configured to estimate a threshold range of the hue value and the cone angle by using the regression model based on a Gaussian probability distribution function. The at least one processor may be configured to detect the dominant perceptual color based on the threshold range of the hue value and the cone angle. The at least one processor may be configured to map the dominant perceptual color with a reference color label as defined and stored in a database. The at least one processor may be configured to predict the color label based on the mapping.

The at least one processor may be configured to pre-train the preprocessed input image using a pre-trained model to output a pre-trained data set. The at least one processor may be configured to apply a transfer learning function to the pre-trained data set to obtain a plurality of classes related to the art images. The at least one processor may be configured to add a regularization in convolution layer to avoid over-fitting of the pre-trained data set. The at least one processor may be configured to remove an old dense layer and add a new dense layers with a dropout layer to obtain the plurality of classes related to the art images. The at least one processor may be configured to retrain at least one of last few layers of convolutional neural network (CNN), to extract art specific features for subject classification based on the plurality of classes. The at least one processor may be configured to classify the plurality of classes into a plurality of subject classes via execution of a trained CNN for the subject classification based on the art specific features. The at least one processor may be configured to determine whether at least two of the plurality of subject classes include overlapping objects. The at least one processor may be configured to, based on the determining that the at least two of the plurality of subject classes include the overlapping objects, perform training of the least two of the plurality of subject classes to obtain an individual class. The at least one processor may be configured to predict a dominant subject name based on the individual class.

The at least one processor may be configured to extract at least one of a Local binary patterns, a GIST feature, or Speeded-Up Robust Feature based on the preprocessed input image. The low-level image features may include spatial information about edges and shapes of the input image.

The mood feature information may be extracted from a keyword present in the description information.

The at least one processor may be configured to map the dominant perceptual color and the low-level image features with respect to the plurality of mood/sentiments classes. The at least one processor may be configured to obtain a relationship between the dominant perceptual color, the low-level image features, and the plurality of mood/sentiments classes, respectively, based on the mapping. The at least one processor may be configured to predict the at least one of the mood or the sentiment that is present in the input image based on the obtained relationship.

The at least one processor may be configured to provide suggestions based on at least one of the mood or the sentiment.

According to an aspect of the disclosure, there is provided a non-transitory computer-readable storage medium storing at least one instruction which, when executed by at least one processor, causes the at least one processor to execute a method including: receiving at least one of art images as an input image; preprocessing the input image; extracting features from the preprocessed input image, wherein the extracting includes: predicting a color label corresponding to a dominant perceptual color detected from the preprocessed input image, detecting a dominant subject from the preprocessed input image, detecting, from the preprocessed input image, low-level image features including spatial information about edges and shapes of the input image, and extracting mood feature information based on a keyword present in a description information included in the input image; classifying the extracted features into a plurality of mood/sentiments classes, using an artificial neural network; and predicting at least one of a mood or a sentiment that is present in the input image based on the dominant perceptual color and the plurality of mood/sentiments classes.

The non-transitory computer-readable storage medium, wherein the preprocessing includes: performing resizing and rotation on the input image by reducing a size of the input image to a predefined size and rotating the input image to at least one of 90 degrees clockwise, 90 degrees counterclockwise, or 180 degrees; and converting the input image into at least one of a grayscale or a binary scale for extracting the low-level image features.

The non-transitory computer-readable storage medium, wherein the predicting the color label further includes: converting RGB image pixels of the preprocessed input image to an HSV color space; applying k-means clustering on the HSV color space, to obtain at least three dominant colors classes representing three different color pixel values in the HSV color space, respectively; determining a hue value and a cone angle based on the at least three dominant colors classes, wherein the cone angle is determined based on a saturation and a value property of the HSV color space, and a range of the hue value is determined through a regression model; estimating a threshold range of the hue value and the cone angle by using the regression model based on a Gaussian probability distribution function; detecting the dominant perceptual color based on the threshold range of the hue value and the cone angle; mapping the dominant perceptual color with a reference color label as defined and stored in a database; and predicting the color label based on the mapping.

The non-transitory computer-readable storage medium, wherein the detecting the dominant subject further includes: pre-training the preprocessed input image using a pre-trained model to output a pre-trained data set; applying a transfer learning function to the pre-trained data set to obtain a plurality of classes related to the art images, wherein the applying the transfer learning function further includes: adding a regularization in convolution layer to avoid overfitting of the pre-trained data set, and removing an old dense layer and adding a new dense layer with a dropout layer to obtain the plurality of classes related to the art images; retraining at least one of last few layers of convolutional neural network (CNN), to extract art specific features for subject classification based on the plurality of classes; classifying the plurality of classes into a plurality of subject classes via execution of a trained CNN for the subject classification based on the art specific features; determining whether at least two of the plurality of subject classes include overlapping objects; based on the determining that the at least two of the plurality of subject classes include the overlapping objects, performing training of the least two of the plurality of subject classes to obtain an individual class; and predicting a dominant subject name based on the individual class.

The non-transitory computer-readable storage medium, wherein the predicting the at least one of the mood or the sentiment further includes: mapping the dominant perceptual color and the low-level image features with respect to the plurality of mood/sentiments classes; obtaining a relationship between the dominant perceptual color, the low-level image features, and the plurality of mood/sentiments classes, respectively, based on the mapping; and predicting the at least one of the mood or the sentiment that is present in the input image based on the obtained relationship.

While specific language has been used to describe embodiments, any limitations arising on account of the same are not intended. As would be apparent to a person in the art, various working modifications may be made to the method in order to implement the inventive concept as taught herein.

The drawings and the foregoing description provide examples of embodiments. Those skilled in the art will appreciate that one or more of the described elements may well be combined into a single functional element. Alternatively, certain elements may be split into multiple functional elements. Elements from one embodiment may be added to an embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for extracting sentiments or mood from art images, the method comprising:

receiving at least one of the art images as an input image;

preprocessing the input image;

extracting features from the preprocessed input image, wherein the extracting the features comprises:

predicting a color label corresponding to a dominant perceptual color detected from the preprocessed input image, wherein the predicting the color label comprises converting the preprocessed input image to a color space, applying clustering to the preprocessed input image on the color space to obtain at least three dominant colors classes representing three different color pixel values in the color space, respectively, determining a hue value and a cone angle based on the at least three dominant colors classes, detecting the dominant perceptual color based on a threshold range of the hue value and the cone angle, mapping the dominant perceptual color with a reference color label as defined in a database, and predicting the color label based on the mapping, detecting a dominant subject from the preprocessed input image, wherein the detecting the dominant subject comprises obtaining a plurality of classes related to the preprocessed input image, extracting art specific features for subject classification based on the plurality of classes, classifying the plurality of classes into a plurality of subject classes based on the art specific features, and predicting a dominant subject name based on the plurality of subject classes, detecting low-level image features from the preprocessed input image by extracting at least one of Local binary patterns, or Speeded-Up Robust Feature based on the preprocessed input image, and extracting mood feature information based on a description information included in the input image from a keyword present in the description information;

inputting the extracted features to an artificial neural network to obtain a plurality of mood/sentiments classes corresponding to the extracted features; and predicting at least one of a mood or a sentiment that is present in the input image based on the dominant perceptual color and the plurality of mood/sentiments classes, wherein the predicting the at least one of the mood or the sentiment comprises:

mapping the dominant perceptual color and the low-level image features with respect to the plurality of mood/sentiments classes, obtaining a relationship between the dominant perceptual color, the low-level image features, and the plurality of mood/sentiments classes, respectively, based on the mapping, and predicting the at least one of the mood or the sentiment that is present in the input image based on the obtained relationship.

2. The method as claimed in claim 1, wherein the preprocessing the input image comprises:

performing resizing and rotation on the input image by reducing a size of the input image to a predefined size and rotating the input image to at least one of 90 degrees clockwise, 90 degrees counterclockwise, or 180 degrees; and converting the input image into at least one of a grayscale or a binary scale for extracting the low-level image features.

3. The method as claimed in claim 2, wherein the predicting the color label further comprises:

converting RGB image pixels of the preprocessed input image to an HSV color space;

applying k-means clustering on the HSV color space, to obtain at least three dominant colors classes representing three different color pixel values in the HSV color space, respectively;

determining a hue value and a cone angle based on the at least three dominant colors classes, wherein the cone angle is determined based on a saturation and a value property of the HSV color space, and a range of the hue value is determined through a regression model;

estimating a threshold range of the hue value and the cone angle by using the regression model based on a Gaussian probability distribution function;

detecting the dominant perceptual color based on the threshold range of the hue value and the cone angle;

mapping the dominant perceptual color with a reference color label as defined and stored in a database; and predicting the color label based on the mapping.

4. The method as claimed in claim 1, wherein the detecting the dominant subject further comprises:

pre-training the preprocessed input image using a pre-trained model to output a pre-trained data set;

applying a transfer learning function to the pre-trained data set to obtain the plurality of classes related to the art images, wherein the applying the transfer learning function further comprises:

adding a regularization in convolution layer to avoid overfitting of the pre-trained data set, and removing an old dense layer and adding a new dense layer with a dropout layer to obtain the plurality of classes related to the art images;

retraining at least one of last few layers of convolutional neural network (CNN), to extract the art specific features for subject classification based on the plurality of classes;

classifying the plurality of classes into the plurality of subject classes via execution of a trained CNN for the subject classification based on the art specific features;

determining whether at least two of the plurality of subject classes comprise overlapping objects;

based on the determining that the at least two of the plurality of subject classes comprise the overlapping objects, performing training of the least two of the plurality of subject classes to obtain an individual class; and predicting the dominant subject name based on the individual class.

5. The method as claimed in claim 1, wherein the detecting the low-level image features further comprises extracting at least one of Local binary patterns, or Speeded-Up Robust Feature based on the preprocessed input image, wherein the low-level image features include spatial information about edges and shapes of the input image.

6. The method as claimed in claim 1, wherein the extracting the mood feature information further comprises extracting the mood feature information from a keyword present in the description information.

7. The method as claimed in claim 1, further comprising providing, by a recommendation engine, a recommendation based on the at least one of the mood or the sentiment.

8. A system for extracting sentiments or mood from art images, the system comprising at least one processor, wherein the at least one processor is configured to:

receive at least one of the art images as an input image, and preprocess the input image;

extract features from the preprocessed input image, wherein the extracting the features comprises:

predicting a color label corresponding to a dominant perceptual color detected from the preprocessed input image, wherein the predicting the color label comprises converting the preprocessed input image to a color space, applying clustering to the preprocessed input image on the color space to obtain at least three dominant colors classes representing three different color pixel values in the color space, respectively, determining a hue value and a cone angle based on the at least three dominant colors classes, detecting the dominant perceptual color based on a threshold range of the hue value and the cone angle, mapping the dominant perceptual color with a reference color label as defined in a database, and predicting the color label based on the mapping, detecting a dominant subject from the preprocessed input image, wherein the detecting the dominant subject comprises obtaining a plurality of classes related to the preprocessed input image, extracting art specific features for subject classification based on the plurality of classes, classifying the plurality of classes into a plurality of subject classes based on the art specific features, and predicting a dominant subject name based on the plurality of subject classes, detecting low-level image features from the preprocessed input image by extracting at least one of Local binary patterns, or Speeded-Up Robust Feature based on the preprocessed input image, and extracting mood feature information based on a description information included in the input image from a keyword present in the description information;

input the extracted features to an artificial neural network to obtain a plurality of mood/sentiments classes corresponding to the extracted features; and predict at least one of a mood or a sentiment that is present in the input image based on the dominant perceptual color and the plurality of mood/sentiments classes, wherein the predicting the at least one of the mood or the sentiment comprises:

mapping the dominant perceptual color and the low-level image features with respect to the plurality of mood/sentiments classes, obtaining a relationship between the dominant perceptual color, the low-level image features, and the plurality of mood/sentiments classes, respectively, based on the mapping, and predicting the at least one of the mood or the sentiment that is present in the input image based on the obtained relationship.

9. The system as claimed in claim 8, wherein the at least one processor is configured to:

perform resizing and rotation on the input image by reducing a size of the input image to a predefined size and rotating the input image to at least one of 90 degrees clockwise, 90 degrees counterclockwise, or 180 degrees; and convert the input image into at least one of a grayscale or a binary scale for extracting the low-level image features.

10. The system as claimed in claim 9, wherein the at least one processor is further configured to:

convert RGB image pixels of the preprocessed input image to an HSV color space;

apply k-means clustering on the HSV color space, to obtain at least three dominant colors classes representing three different color pixel values in the HSV color space, respectively;

determine a hue value and a cone angle based on the at least three dominant colors classes, wherein the cone angle is determined based on a saturation and a value property of the HSV color space, and a range of the hue value is determined through a regression model;

estimate a threshold range of the hue value and the cone angle by using the regression model based on a Gaussian probability distribution function;

detect the dominant perceptual color based on the threshold range of the hue value and the cone angle; map the dominant perceptual color with a reference color label as defined and stored in a database; and predict the color label based on the mapping.

11. The system as claimed in claim 8, wherein the at least one processor is further configured to:

pre-train the preprocessed input image using a pre-trained model to output a pre-trained data set;

apply a transfer learning function to the pre-trained data set to obtain the plurality of classes related to the art images;

add a regularization in convolution layer to avoid overfitting of the pre-trained data set;

remove an old dense layer and add a new dense layers with a dropout layer to obtain the plurality of classes related to the art images;

retrain at least one of last few layers of convolutional neural network (CNN), to extract the art specific features for subject classification based on the plurality of classes;

classify the plurality of classes into the plurality of subject classes via execution of a trained CNN for the subject classification based on the art specific features;

determine whether at least two of the plurality of subject classes comprise overlapping objects;

based on the determining that the at least two of the plurality of subject classes comprise the overlapping objects, perform training of the least two of the plurality of subject classes to obtain an individual class; and predict the dominant subject name based on the individual class.

12. The system as claimed in claim 8, wherein the at least one processor is further configured to extract at least one of a Local binary patterns, or Speeded-Up Robust Feature based on the preprocessed input image, and wherein the low-level image features includes spatial information about edges and shapes of the input image.

13. The system as claimed in claim 8, wherein the mood feature information is extracted from a keyword present in the description information.

14. A non-transitory computer-readable storage medium storing at least one instruction which, when executed by at least one processor, causes the at least one processor to execute a method including:

receiving at least one of art images as an input image;

preprocessing the input image;

extracting features from the preprocessed input image, wherein the extracting the features includes:

predicting a color label corresponding to a dominant perceptual color detected from the preprocessed input image, wherein the predicting the color label comprises converting the preprocessed input image to a color space, applying clustering to the preprocessed input image on the color space to obtain at least three dominant colors classes representing three different color pixel values in the color space, respectively, determining a hue value and a cone angle based on the at least three dominant colors classes, detecting the dominant perceptual color based on a threshold range of the hue value and the cone angle, mapping the dominant perceptual color with a reference color label as defined in a database, and predicting the color label based on the mapping, detecting a dominant subject from the preprocessed input image, wherein the detecting the dominant subject comprises: obtaining a plurality of classes related to the preprocessed input image, extracting art specific features for subject classification based on the plurality of classes, classifying the plurality of classes into a plurality of subject classes based on the art specific features, and predicting a dominant subject name based on the plurality of subject classes, detecting low-level image features from the preprocessed input image by extracting at least one of Local binary patterns, or Speeded-Up Robust Feature based on the preprocessed input image, and extracting mood feature information based on a description information included in the input image from a keyword present in the description information;

inputting the extracted features to an artificial neural network to obtain a plurality of mood/sentiments classes corresponding to the extracted features; and predicting at least one of a mood or a sentiment that is present in the input image based on the dominant perceptual color and the plurality of mood/sentiments classes, wherein the predicting the at least one of the mood or the sentiment comprises:

mapping the dominant perceptual color and the low-level image features with respect to the plurality of mood/sentiments classes, obtaining a relationship between the dominant perceptual color, the low-level image features, and the plurality of mood/sentiments classes, respectively, based on the mapping, and predicting the at least one of the mood or the sentiment that is present in the input image based on the obtained relationship.

* * * * *